United States Patent
Nemura

(10) Patent No.: US 9,535,312 B2
(45) Date of Patent: *Jan. 3, 2017

(54) PROJECTOR WITH A LENS SHIFT MECHANISM CONFIGURED TO MOVE A PROJECTION LENS

(71) Applicant: Seiko Epson Corporation, Tokyo (JP)

(72) Inventor: Akira Nemura, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,171

(22) Filed: Sep. 1, 2015

(65) Prior Publication Data

US 2015/0370152 A1  Dec. 24, 2015

Related U.S. Application Data

(63) Continuation of application No. 14/031,627, filed on Sep. 19, 2013, now Pat. No. 9,154,755.

(30) Foreign Application Priority Data

Sep. 28, 2012  (JP) .................................. 2012-215815
Sep. 28, 2012  (JP) .................................. 2012-215817

(51) Int. Cl.
*G03B 21/14* (2006.01)
*H04N 9/31* (2006.01)
*G03B 21/22* (2006.01)

(52) U.S. Cl.
CPC ............ *G03B 21/142* (2013.01); *H04N 9/317* (2013.01); *G03B 21/22* (2013.01)

(58) Field of Classification Search
CPC .... H04N 9/317; H04N 9/3141; H04N 9/3197; G03B 21/22
See application file for complete search history.

(56) References Cited

U.S. PATENT DOCUMENTS 6,616,283 B1 * 9/2003 Takano .................. G03B 21/22
                                              353/101
6,639,730 B2  10/2003 Muto et al.
(Continued)

FOREIGN PATENT DOCUMENTS

CN       1484058 A    3/2004
CN     102298248 A   11/2011
(Continued)

OTHER PUBLICATIONS

Notice of Allowance and Notice of Allowability received in U.S. Appl. No. 14/031,627, Jun. 15, 2015.

*Primary Examiner* — Sultan Chowdhury
(74) *Attorney, Agent, or Firm* — ALG Intellectual Property, LLC

(57) ABSTRACT

A lens shift mechanism includes a movable portion configured to support a projection lens and movable in two directions orthogonal to each other in a plane orthogonal to an optical axis; first and second operating units configured to generate drive forces for moving the movable portion in the two directions, respectively, first and second rotating portions to which the drive forces generated by the first and second operating units are transmitted, and a lock mechanism configured to be capable of switching between a locked state in which the two operating units are locked and an unlocked state in which the two rotating portions are rotatable, and the lock mechanism includes first and second locking members configured to lock the first and second rotating portions respectively and a lever mechanism configured to move the two locking members.

7 Claims, 12 Drawing Sheets

(56) References Cited

U.S. PATENT DOCUMENTS

| | | | |
|---|---|---|---|
| 7,551,376 B2 * | 6/2009 | Koyama | G03B 5/00 359/811 |
| 8,483,555 B2 | 7/2013 | Iwasaki | |
| 2004/0027692 A1 | 2/2004 | Hoshide et al. | |
| 2005/0030491 A1 | 2/2005 | Gishi | |
| 2005/0185152 A1 | 8/2005 | Velde et al. | |
| 2006/0050253 A1 * | 3/2006 | Iinuma | G03B 21/22 353/119 |
| 2007/0019948 A1 | 1/2007 | Terada | |
| 2009/0277744 A1 | 11/2009 | Shinagawa et al. | |
| 2011/0310364 A1 | 12/2011 | Wakabayashi | |
| 2012/0293781 A1 | 11/2012 | Yoshihara et al. | |

FOREIGN PATENT DOCUMENTS

| | | |
|---|---|---|
| JP | 2005-055644 A | 3/2005 |
| JP | 2007-78729 A | 3/2007 |
| JP | 2008-268627 A | 11/2008 |
| JP | 2009-270702 A | 11/2009 |
| JP | 2010-256388 A | 11/2010 |
| JP | 2012-042696 A | 3/2012 |
| WO | WO-2011-108074 A | 9/2011 |

* cited by examiner

PROJECTOR WITH A LENS SHIFT MECHANISM CONFIGURED TO MOVE A PROJECTION LENS

CROSS REFERENCE TO RELATED APPLICATIONS

This application is a continuation application of U.S. patent application Ser. No. 14/031,627 filed on Sep. 19, 2013, which claims priority to Japanese Patent Application No. 2012-215815 and No. 2012-215817 each filed on Sep. 28, 2012, the entire contents of which are incorporated by reference herein.

BACKGROUND

1. Technical Field

The present invention relates to a projector.

2. Related Art

In the related art, a projector including a light modulating apparatus configured to modulate an optical flux emitted from a light source and a projection lens configured to project the modulated optical flux is known. There is proposed a projector provided with a lens shift mechanism configured to move the projection lens so as to allow a user to move a projected image without moving the projector.

There is also proposed a technology provided with a lock mechanism in a lens shift mechanism so as to prevent an image projected by a projection lens moved for some reasons from being displaced (for example, see JP-A-2007-78729).

The lock mechanism described in JP-A-2007-78729 includes a lever member configured to allow a user to perform a sliding operation, a horizontal lock member configured to disengageably engage a spur gear on a back side of a horizontal operation dial to enable or disable an operation of the horizontal operation dial according to the sliding operation of the lever member, a vertical lock member configured to disengageably engage a spur gear on a back side of a vertical operation dial to enable or disable an operation of the vertical operation dial, and a torsion spring configured to urge the respective lock members in the direction toward the respective spur gears.

The horizontal lock member and the vertical lock member are each configured to engage and disengage the spur gear by rotating about a shaft extending parallel to a center axis of rotation of the spur gear to be engaged and disengaged.

However, the lens shift mechanism described in JP-A-2007-78729 has problems of complicated structure and complexity in manufacture due to a configuration of the lock mechanism in which the horizontal lock member and the vertical lock member are assembled to shafts extending parallel to the center axes of rotation of the spur gears of the operation dials, and increase in size of the lock mechanism or generation of restriction in arrangement of other members due to an arrangement of the horizontal lock member and the vertical lock member in the direction orthogonal to the center axes of rotation. Also, the lens shift mechanism described in JP-A-2007-78729 has a risk of breakage of members which constitute the lens shift mechanism when a drive force which causes the projection lens to move further is exerted thereon when the projection lens reaches a limit of movable range.

SUMMARY

An advantage of some aspects of the invention is to solve at least a part of the problems described above, and the invention can be implemented as the following forms or application examples.

Application Example 1

A projector according to this application example of the invention includes: a projection lens configured to project light and a lens shift mechanism configured to move the projection lens, wherein the lens shift mechanism includes: a movable portion configured to support the projection lens and movable in a first direction and a second direction orthogonal to each other in a plane orthogonal to an optical axis of the projection lens; a first operating unit configured to generate a drive force causing the movable portion to be moved in the first direction by a manual operation; a second operating unit configured to generate a drive force causing the movable portion to be moved in the second direction by the manual operation; a first rotating portion configured to be rotated by the drive force generated by the first operating unit transmitted thereto; a second rotating portion configured to be rotated by the drive force generated by the second operating unit transmitted thereto; and a lock mechanism capable of switching between a locked state in which the first rotating portion and the second rotating portion are locked and an unlocked state in which the first rotating portion and the second rotating portion are rotatable; and the lock mechanism includes: a first locking member moving along a center axis of rotation of the first rotating portion to lock the first rotating portion; a second locking member moving along a center axis of rotation of the second rotating portion to lock the second rotating portion; and a lever mechanism configured to move the first locking member and the second locking member to switch between the locked state and the unlocked state.

In this configuration, the lens shift mechanism includes the lock mechanism configured as described above, and the lock mechanism is configured to switch between the locked state in which the first rotating portion and the second rotating portion are locked and the unlocked state by the movement of the first locking member and the second locking member by the lever mechanism.

The first rotating portion and the second rotating portion are rotated by the drive forces generated respectively by the first operating unit and the second operating unit being transmitted thereto, and hence the rotating operation of the first operating unit and the second operating unit is disabled in the locked state. In contrast, since the first rotating portion and the second rotating portion are unlocked in the unlocked state, the rotating operations of the first operating unit and the second operating unit are enabled.

Accordingly, the projecting lens may be fixed to a predetermined position by moving the projecting lens by operating the first operating unit and the second operating unit in the unlocked state and by bringing the first operating unit and the second operating unit into the state not capable of rotating in the locked state. Therefore, prevention of moving the projection lens by touching the first operating unit and the second operating unit by mistake and a feeling of anxiety that the projection lens might be moved due to vibrations or the like may be removed from the user.

Since the lock mechanism is configured to switch between the locked state and the unlocked state by the movement of the first locking member and the second locking member along the respective center axes of the first operating unit and the second operating unit of the members locked thereby, the lock mechanism achieving simplification of the structure and space saving in the direction orthogonal to the center axes of rotation (the peripheries of the first rotating portion and the second rotating portion) is enabled. Since the structure becomes specifically complex in the lens shift mechanism which allows the movement of the projection lens in two directions, the remarkable effect is expected. Therefore, increase in size and complexity of manufacture are suppressed, whereby the projector provided with the lens shift mechanism which is capable of moving the projection lens and fixing the projection lens at a desired position may be provided.

Application Example 2

In the projector according to the above-described application example, it is preferable that the first operating unit and the second operating unit are dials configured to generate the drive force by being rotated, the first rotating portion is a gear configured to rotate together with the first operating unit about the center axis of rotation of the first operating unit, and the second rotating portion is a gear configured to rotate together with the second operating unit about the center axis of rotation of the second operating unit.

In this configuration, the first operating unit and the first rotating portion rotate about a common center axis of rotation, and the first locking member is configured to move along the common center axis of rotation and be capable of locking the first rotating portion formed as a gear. In the same manner, the second operating unit and the second rotating portion rotate about a common center axis of rotation, and the second locking member is configured to move along the common center axis of rotation and be capable of locking the second rotating portion formed as a gear. Accordingly, the drive forces from the first operating unit and the second operating unit are transmitted by a plurality of transmitting gears, and hence the influence of the backrush is small in comparison with a configuration of locking the transmitting gear centered at an axis different from the center axes of rotation of the first operating unit and the second operating unit. Therefore, rattling of the first operating unit and the second operating unit in the locked state may be reduced. Therefore, the projection lens may be fixed reliably at a desired position.

Application Example 3

In the projector according to the above-described application example, it is preferable that the lock mechanism includes: an urging portion configured to urge the first locking member in the direction of the center axis of rotation of the first rotating portion; and an urging portion configured to urge the second locking member in the direction of the center axis of rotation of the second rotating portion.

In this configuration, since the lock mechanism includes the above-described urging portion, the first locking member and the second locking member may be switched from a state of being maintained in one of the locked state and the unlocked state by the urging portion to the other state by the lever mechanism. Accordingly, the first locking member and the second locking member may be positioned at stable positions without an influence of posture of installation of the projector (for example, the stationary installation in which the projector is stationarily installed on a desk or hanging installation in which the projector is installed on a ceiling or the like in a state of being inverted from the stationary installation). Therefore, the projector which achieves the fixation of the projection lens at a desired position without the influence of the posture of installation may be provided.

Application Example 4

In the projector according to the above-described application example, it is preferable that the lever mechanism includes: a first moving member configured to move the first locking member along the center axis of rotation of the first rotating portion by the rotation thereof, a second moving member configured to move the second locking member along the center axis of rotation of the second rotating portion by the rotation thereof, and a lever configured to rotate the first moving member and the second moving member by the movement thereof.

In this configuration, the first moving member and the second moving member are rotated by the movement of the lever, and the first locking member and the second locking member are moved by the rotation of the first moving member and the second moving member, whereby the locking state and the unlocking state are switched. In other words, an operating force which moves the lever is transmitted to the first moving member and the second moving member as a rotational torque and hence moves the first locking member and the second locking member. Accordingly, in comparison with a configuration in which the operation force which moves the lever is transmitted linearly to the first locking member and the second locking member, smooth movements of the first locking member and the second locking member and setting the amount of movement of the lever to be small are enabled. Therefore, the lock mechanism achieving improvement of the operability and space saving is achieved.

Application Example 5

In the projector according to the above-described application example, it is preferable that an exterior housing which constitutes an outer jacket of the projector is further provided, and the first operating unit and the second operating unit are the dials configured to generate the drive force by being rotated, and the first operating unit and the second operating unit are each exposed from the exterior housing at one of end portions thereof in the direction of the center axis of rotation and at least part of an outer peripheral portion thereof apart from the center axis of rotation thereof.

In this configuration, since the lock mechanism is configured to achieve space saving in the direction orthogonal to the center axes of rotation, the lock mechanism may be mounted on the projector even when the first operating unit and the second operating unit are each arranged at an edge portion of the exterior housing. Then, the first operating unit and the second operating unit are each exposed from the exterior housing at the one of the end portions thereof in the direction of the center axes of rotation and at least the part of the outer peripheral portion. Accordingly, since the user is allowed to select either the one of the end portions or the outer peripheral portion as desired corresponding to the installation posture of the projector (for example, the stationary installation, the hanging installation, and the like). Accordingly, improvement of operability when moving the projection lens is achieved.

Application Example 6

In the projector according to the above-described application example, it is preferable that at least parts of the outer peripheral portions of the first operating unit and the second operating unit are exposed from the exterior housing to the side where the projection lens projects light and the one of the end portions of the first operating unit and the second operating unit are exposed to the upper side of the exterior housing in a stationary installation in which the projector is stationary installed.

In this configuration, the first operating unit and the second operating unit are arranged as described above, the projection lens may be moved by an operation from the side of the exterior housing in which the projection lens projects light or from the upper side in the stationary installation.

Application Example 7

In the projector according to the above-described application example, it is preferable that the lever mechanism includes a lever operating unit which accepts an operation for switching between the locked state and the unlocked state, and the lever operating unit is arranged between the one of the end portions of each of the first operating unit and the second operating unit.

In this configuration, the lever operating unit is arranged between the first operating unit and the second operating unit exposed on the upper side of the exterior housing of the stationary installation. Accordingly, the user is capable of recognizing the position to be operated for moving the projection lens and the position to be operated for fixing the projection lens easily. In addition, the first operating unit, the second operating unit, and the lever operating unit may be arranged in an orderly manner. Therefore, improvement of design properties of the projector is achieved.

Application Example 8

A projector according to this application example of the invention includes: a projection lens configured to project light and a lens shift mechanism configured to move the projection lens, wherein the lens shift mechanism includes: a movable portion configured to support the projection lens and movable in a direction orthogonal to an optical axis of the projection lens; a drive unit to which a drive force for moving the movable portion is transmitted; a switching mechanism capable of switching the drive force transmitted to the drive unit between a transmitting state in which a transmission to the movable portion is enabled and a non-transmitting state in which the transmission to the movable portion is disabled; and a transmitting unit configured to transmit the drive force transmitted by the switching mechanism to the movable portion, the switching mechanism includes: a first gear configured to engage one of the drive unit and the transmitting unit, a second gear having a center axis of rotation coaxial with a center axis of rotation of the first gear and configured to engage the other one of the drive unit and the transmitting unit, a switching member movably arranged between the first gear and the second gear along the center axis of rotation and configured to engage the first gear and rotate together with the first gear about the center axis of rotation; and an urging portion configured to urge the switching member toward the second gear, wherein the second gear includes a plurality of first tooth portions disposed on an circumference centered at the center axis of rotation equidistantly on the side of the switching member, wherein the switching member includes a second tooth portion configured to engage the first tooth portion by an urging force of the urging portion, the transmitting state is a state in which the first tooth portion and the second tooth portion engage with each other and hence the first gear and the second gear both rotate, whereby the drive force is transmittable from one to the other one of the first gear and the second gear when the drive force is transmitted to the drive unit in a movable range of the movable portion, and the non-transmitting state is a state in which the movable portion reaches the limit of the movable range and hence the movement thereof is restricted and, when the drive force in the direction corresponding to a direction in which the movement of the movable portion is restricted is transmitted to the drive unit, the switching member is moved in the direction away from the second gear against the urging force of the urging portion, whereby one of the first gear and the second gear engaging the drive unit rotates and the other one of the first gear and the second gear engaging the transmitting unit is restricted from rotating, so that the drive force is not transmitted from one to the other of the first gear and the second gear.

In this configuration, the lens shift mechanism includes the switching mechanism, and the switching mechanism is configured to be capable of switching between the transmitting state which allows transmission of the drive force of the drive unit to the transmitting unit in a range in which the movable portion is movable (the movable range), and the non-transmitting state in which the drive force of the drive unit is not transmitted to the transmitting unit in a state in which the movable portion reaches the limit of the movable range and the movement is restricted (a movement restricted state).

In other words, the switching member of the switching mechanism includes the second tooth portion and rotates together with the first gear. Then, the switching member is urged by the urging portion, and engages the first tooth portion of the second gear. Then, the switching member maintains the state in which the second tooth portion engages the first tooth portion within the movable range of the movable portion, and transmits the drive force from the drive unit from the first gear to the second gear, or from the second gear to the first gear. In other words, the switching mechanism is brought into the transmitting state, and the lens shift mechanism moves the movable portion, that is, the projection lens by transmitting the drive force from the switching mechanism to the transmitting unit in sequence upon transmission of the drive force to the drive unit.

In contrast, when the movable portion is brought into the movement restricted state, the transmitting unit and one of the first gear and the second gear engaging the transmitting unit are restricted from rotating in the direction corresponding to the direction in which the movement of the movable portion is restricted (restricted direction). When the drive force in the direction corresponding to the restricted direction is exerted on the drive unit in this movement restricted state, the drive force is transmitted from the other one of the first gear and the second gear to the switching member. Then, the switching member (second tooth portion) to which the drive force is transmitted moves in the direction away from the second gear (first tooth portion) against the urging force of the urging portion, and the first gear or the second gear is idled. In other words, the switching mechanism is in the non-transmitting state in which the drive force of the drive unit is not transmitted to the transmitting unit.

In this manner, since the lens shift mechanism includes the switching mechanism which allows switching between the transmitting state and the non-transmitting state, the drive force of the drive unit may be reliably transmitted to the movable portion within the movable range of the movable portion, and the drive force in the direction corresponding to the restricted direction from the drive unit may be prevented from being transmitted to the movable portion in the movement restricted state of the movable portion. Accordingly, even when the drive force in the direction corresponding to the restricted direction is generated in the drive unit in the movement restricted state of the movable portion, the drive force is not transmitted to the movable portion, and hence the breakage of the member or the like which constitutes the lens shift mechanism may be prevented.

Since the switching mechanisms each have a configuration of engaging the first tooth portion provided on the second gear and the second tooth portion provided on the switching member, transmission of the drive force between the both members may be ensured in comparison with the configuration in which a frictional force generated by a slip mechanism is utilized, so that the setting of the members which constitute the switching mechanism is facilitated.

Also, transmission of the drive force of the drive unit to the movable portion is ensured within the movable range of the movable portion even when the urging force of the urging portion is smaller than that of the configuration utilizing the slip mechanism.

Therefore, the lens shift mechanism provided with the switching mechanism which achieves reduction in size and weight and is easy to manufacture is achieved. Therefore, the projector having the lens shift mechanism described above may be provided while suppressing increase in size and weight and simplifying the manufacture.

When the drive force in the direction corresponding to the restricted direction is generated by the drive unit in the movement restricted state of the movable portion, either one of the first tooth portion and the second tooth portion rotates while climbing over the other one of those, an action sound is generated, and hence the user is capable of recognizing the fact that the projection lens reaches the limit of the movable range easily.

In addition, the switching mechanism has a configuration including the first gear and the second gear, improvement of flexibility in setting of the reduction gear ratio or the torque with respect to the drive unit and the transmitting unit is achieved in comparison with a slip mechanism including one gear.

Application Example 9

In the projector according to the above-described application example, it is preferable that the drive force is transmitted to the drive unit by a manual operation.

In this configuration, since the drive unit is configured to be a manually operating type, when the movable portion reaches the limit of the movable range, the user operating the drive unit may have a tactile feedback of click response when one of the first tooth portion and the second tooth portion climbs over the other one of those, so that the user is capable of recognizing the fact that the movable portion reaches the limit of the movable range easily.

Application Example 10

In the projector according to the above-described application example, it is preferable that the lens shift mechanism includes: a dial configured to generate the drive force for moving the movable portion by the rotating operation, the drive unit is a drive gear configured to rotate about a center axis of rotation of the dial, the first gear includes a tooth shape forming portion formed with a tooth shape configured to engage one of the drive gear and the transmitting unit, and a projecting portion projecting from the tooth shape forming portion provided with the storage portion for storing the urging portion, and the first gear is arranged so that the projecting portion is positioned on a side opposite to the side where the dial is arranged with respect to the tooth shape forming portion.

In this configuration, since the first gear is provided with the storage for storing the urging portion, the switching mechanism may be configured with a simple configuration while suppressing increase in number of components.

Since the first gear is arranged so that the projecting portion is positioned on a side opposite to the dial, storage of the projecting portion in the exterior housing of the projector while exposing the dial from the exterior housing is easily achieved. Therefore, the projector in which operability of the lens shift mechanism is improved, the switching mechanism is efficiently stored in the exterior housing, and design properties are improved may be provided.

Application Example 11

In the projector according to the above-described application example, it is preferable that surfaces of the first tooth portion and the second tooth portion engaging each other are formed by flat surfaces.

In this configuration, since the surfaces of the first tooth portion and the second tooth portion engaging each other are each formed of a flat surface, the first tooth portion and the second tooth portion are in surface contact and hence the frictional force is increased in comparison with the configuration in which the engaging surfaces are formed by curved surfaces. Accordingly, a reliable transmitting state is ensured even when the amount of engagement between the first tooth portion and the second tooth portion is set to a small amount, or even when the urging force of the urging portion is set to a small value, so that further reduction in size and weight of the switching mechanism is achieved.

Application Example 12

In the projector according to the above-described application example, it is preferable that the first tooth portion and the second tooth portion include inclined portions engaging each other and making the second gear and the switching member both rotatable.

In this configuration, since the first tooth portion and the second tooth portion are formed as described above, smooth switching between the transmitting state and the non-transmitting state of the switching mechanism is enabled.

Application Example 13

In the projector according to the above-described application example, it is preferable that an exterior housing which constitutes an outer jacket of the projector is included, wherein the lens shift mechanism includes: the dial configured to generate the drive force for moving the movable portion by the rotating operation; at least part of an outer peripheral portion of the dial at a position apart from a center axis of rotation is exposed from the exterior housing to the side where the projection lens projects light and one of end portions in the direction of the center axis of rotation is exposed to the upper side of the exterior housing in a stationary installation in which the projector is stationary installed.

In this configuration, the dial is exposed from two different sides of the exterior housing as described above. Accordingly, since the user is capable of selecting either the one end portion or the outer peripheral portion as desired corresponding to the installation posture of the projector (for example, the stationary installation, hanging installation, and the like), improvement of operability when moving the projection lens is enabled.

Since the dial is exposed as described above, the projection lens may be moved by an operation from the side facing a surface of projection of the exterior housing or from the upper side in the stationary installation.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
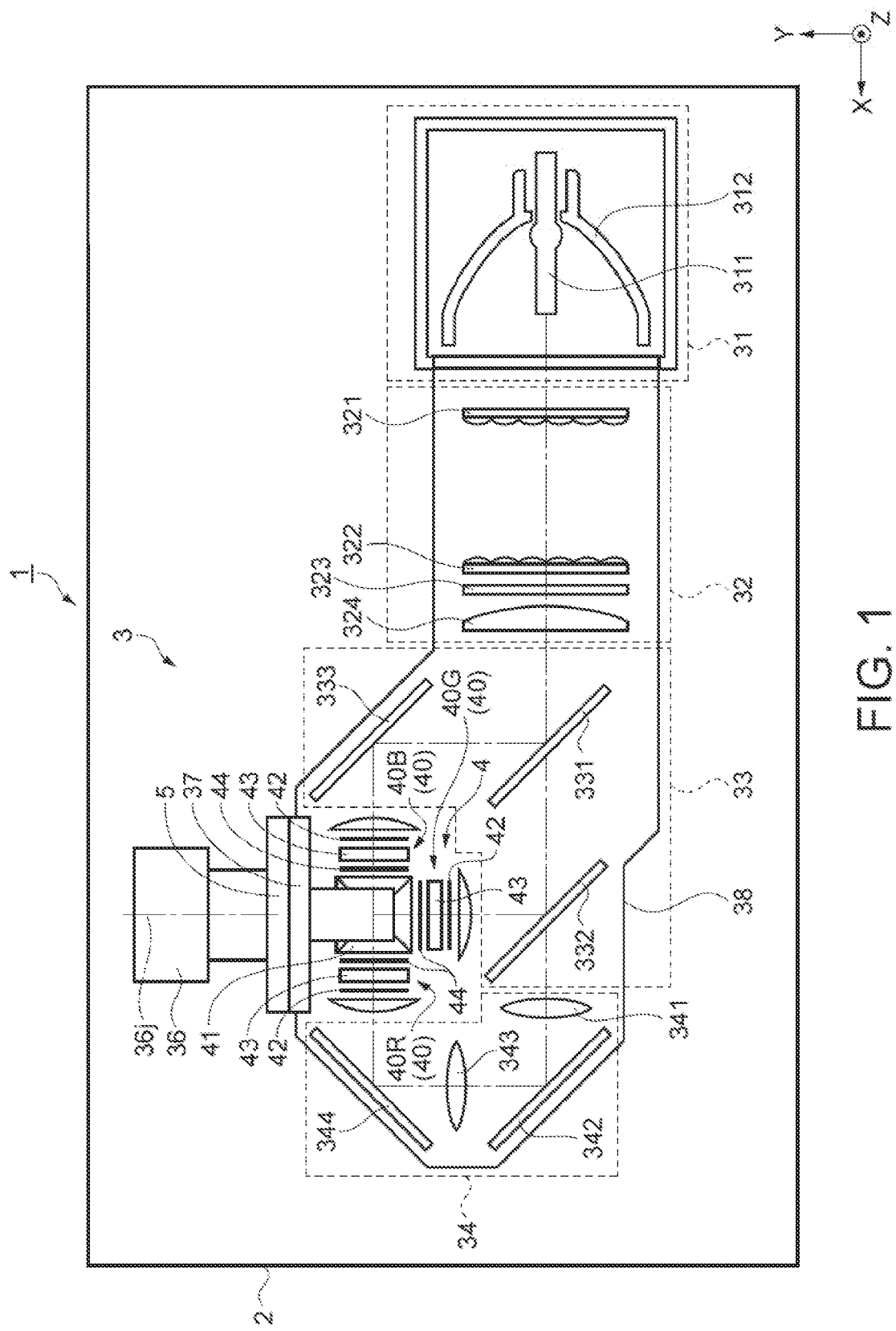
FIG. 1 is a diagrammatic drawing illustrating a schematic configuration of a projector of an embodiment.

Referring now to the drawings, a projector according to an embodiment will be described.

The projector of the embodiment is configured to modulate an optical flux emitted from a light source according to image information and project an image on a projected surface such as a screen.

Principal Configuration of Projector

FIG. 1 is a diagrammatic drawing illustrating a schematic configuration of a projector 1 of the embodiment.

The projector 1 includes an exterior housing 2 constituting an exterior, a control unit (not illustrated), and an optical unit 3 having a light source apparatus 31 and a projection lens 36 as illustrated in FIG. 1. Although not illustrated in the drawing, alight source apparatus configured to supply power to the light source apparatus 31 and the control unit, and also a cooling apparatus configured to cool the optical unit 3 or the like are arranged in the interior of the exterior housing 2.

The projector 1 of the embodiment includes a lens shift mechanism 5 configured to move the projection lens 36, and is configured to be capable of moving an image projected on the screen or the like. The projector 1 of the embodiment includes a lock mechanism so as to prevent the projection lens 36 positioned at a predetermined position from being moved erroneously. In the following description, the direction in which a light flux goes out from the projection lens 36 is defined as the front side and the upper side of the projector 1 in stationary installation, that is, stationarily installed when the projector 1 is installed on a desk or the like, is defined the an upper side for the sake of convenience of description.

Figure 2:
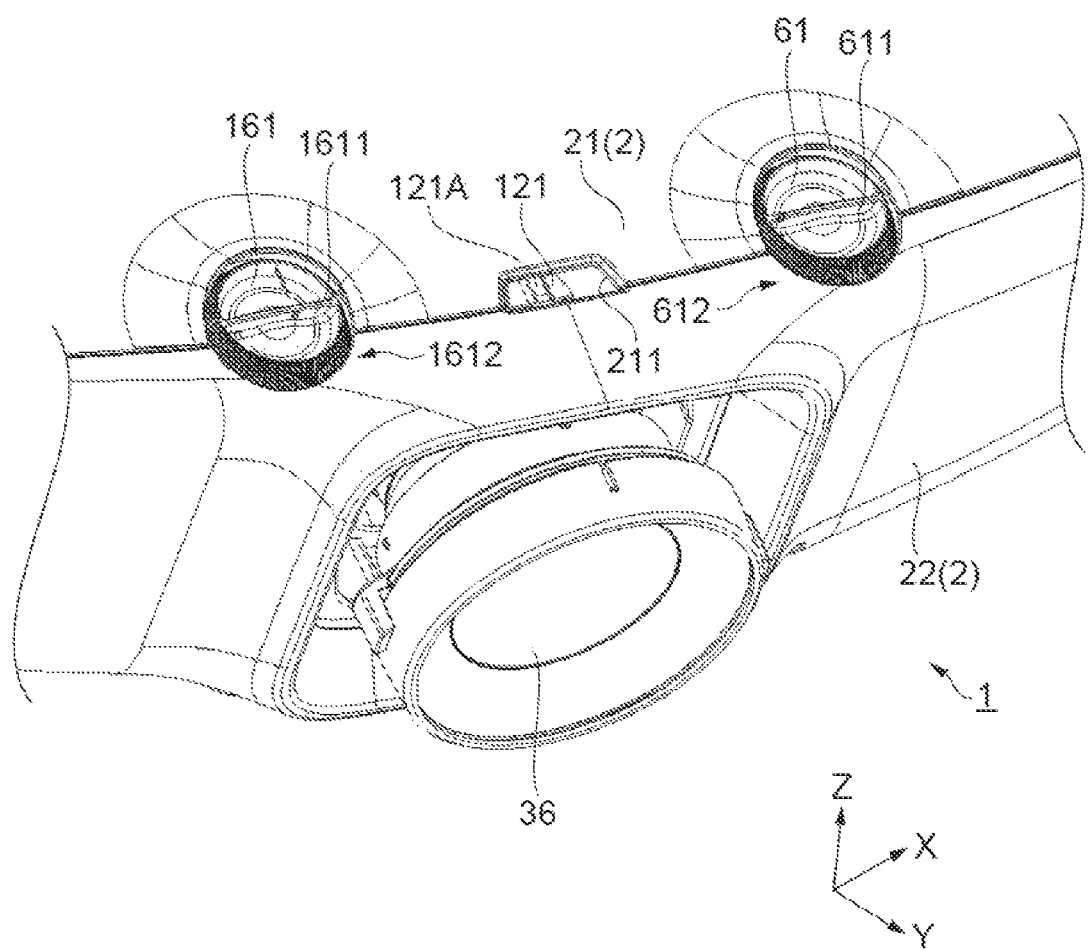
FIG. 2 is a perspective view illustrating part of an appearance of the projector of the embodiment.

FIG. 2 is a perspective view illustrating part of an appearance of the projector 1 near the projection lens 36.

The exterior housing 2 is formed of a synthetic resin and, as illustrated in FIG. 2, includes an upper case 21 configured to form an upper portion of the exterior housing 2, a lower case (not illustrated) configured to form a lower portion, and a front case 22 configured to forma front portion, and these members are fixed with screws or the like.

The front case 22 is provided with an opening at a center portion thereof and is formed so as to expose a distal end portion of the projection lens 36 from the opening as illustrated in FIG. 2. The upper case 21 and the front case 22 are formed so as to expose a dial 61 as a first operating unit and a dial 161 as a second operating unit for operating the lens shift mechanism 5 at a boundary portion of these members. The upper case 21 is provided with an opening portion 211 on an upper surface thereof between the dial 61 and the dial 161, and the lever operating unit 121 for operating the lock mechanism is exposed from the opening portion 211 as illustrated in FIG. 2.

Although the illustration is omitted, the exterior housing 2 is provided with an air intake port for taking in outside air and an exhaust port for exhausting warmed air in the interior of the exterior housing 2 to the outside.

The control unit including a CPU (Central Processing Unit), a ROM (Read Only Memory), a RAM (Random Access Memory) functions as a computer, and performs control of the operation of the projector 1, for example, control relating to projection of images.

Configuration of Optical Unit

The optical unit 3 optically processes an optical flux emitted from the light source apparatus 31 and projects the same under the control of the control unit.

The optical unit 3 includes, in addition to the light source apparatus 31, an integrator illuminating optical system 32, a color separating optical system 33, a relay optical system 34, an optical apparatus 4, the projection lens 36, a head member 37, the lens shift mechanism 5, and an optical component housing 38 configured to arrange these members at predetermined positions on an optical path as illustrated in FIG. 1.

The optical unit 3 is formed into a substantially L-shape in plan view as illustrated in FIG. 1, and includes the light source apparatus 31 demountably arranged at one end portion thereof and the projection lens 36 arranged on the other end portion thereof. In the following description, a direction in which the optical flux goes out from the light source apparatus 31 is described as +X direction, a direction in which light projected from the projector 1 goes out is described as +Y direction (forward direction), and an upper direction is described as +Z direction for the sake of convenience of description. The ±X direction is defined as a lateral direction.

The light source apparatus 31 includes a light source 311 of a discharge type including an extra-high pressure mercury lamp or a metal halide lamp and a reflector 312, and is configured to reflect an optical flux emitted for the light source 311 by the reflector 312, and cause the reflected light to go out toward the integrator illuminating optical system 32.

The integrator illuminating optical system 32 includes a first lens array 321, a second lens array 322, a polarization conversion element 323, and a superimposing lens 324, and is configured so that the optical flux emitted from the light source apparatus 31 is irradiated substantially uniformly on the surface of a liquid crystal light valve 43 and is used effectively.

The color separating optical system 33 includes two dichroic mirrors 331 and 332 and a reflection mirror 333, and has a function to split the optical flux going out from the integrator illuminating optical system 32 into three color lights; a red light (hereinafter, referred to as "R-light"), a green light (hereinafter, referred to as "G-light"), and a blue light (hereinafter, referred to as "B-light").

The relay optical system 34 includes an incident-side lens 341, a relay lens 343, and reflection mirrors 342 and 344, and has a function to guide the R-light separated by the color separating optical system 33 to the liquid crystal light valve 43 for the R-light. The optical unit 3 has a configuration such that the relay optical system 34 guides the R-light, the invention is not limited thereto, and a configuration in which the B-light is guided is also applicable, for example.

The optical apparatus 4 includes electric optical apparatuses 40 provided for the respective color lights (an R-light electric optical apparatus is denoted by 40R, a G-light electric optical apparatus is denoted by 40G, and a B-light electric optical apparatus is denoted by 40B), and a cross-dichroic prism 41 as a color combining optical apparatus.

The respective electric optical apparatuses 40 each include an incident-side polarizer 42, the liquid crystal light valve 43 as a light-modulating apparatus, and an outgoing side polarizer 44, and modulate each color light according to the image information.

The cross dichroic prism 41 is formed into a substantially square shape in plan view by bonding four rectangular prisms, and two dielectric multilayer films are formed at an interface of bonded rectangular prisms. The cross-dichroic prism 41 is configured to reflect color lights modulated by the electric optical apparatuses 40R and 40B from the dielectric multilayer films, and allow color light modulated by the electric optical apparatus 40G to pass therethrough to combine the respective color lights.

The projection lens 36 includes a plurality of lenses (not illustrated) arranged along an optical axis 36j and projects the light combined by the cross-dichroic prism 41 on the screen in an enlarged scale.

Figure 3:
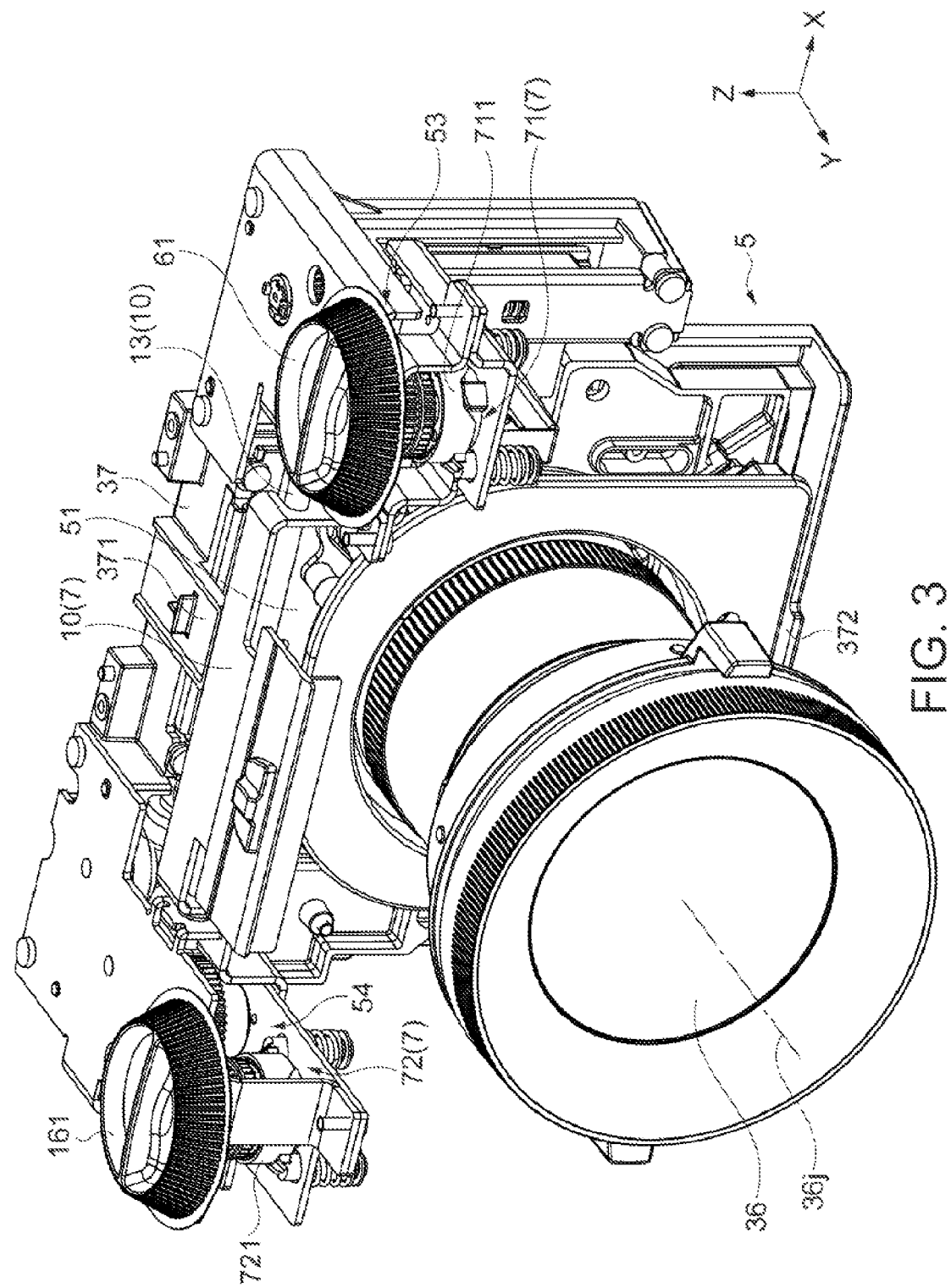
FIG. 3 is a perspective view of a projection lens, a lens shift mechanism, and a head body of the embodiment.

FIG. 3 is a perspective view of the projection lens 36, the lens shift mechanism 5, and the head member 37.

The lens shift mechanism 5 causes the projection lens 36 to move in a plane orthogonal to the optical axis 36j in a first direction (vertical direction) and a second direction (lateral direction) orthogonal to each other by the dials 61 and 161 being rotated by a manual operation, although detailed description will be given below.

The head member 37 supports the lens shift mechanism 5 and is mounted on the optical component housing 38. The head member 37 is provided with an upper restricting portion 371 configured to restrict an upward movement of the projection lens 36 and a lower restricting portion 372 configured to restrict a downward movement of the projection lens 36 as illustrated in FIG. 3. Although not illustrated, the head member 37 is provided with a restricting portion for restricting a movement of the projection lens 36 in the lateral direction.

Configuration of Lens Shift Mechanism

Here, the lens shift mechanism 5 will be described in detail.

The lens shift mechanism 5 is provided with a first movable portion 51, a second movable portion (not illustrated), a first gear train mechanism 53, a second gear train mechanism 54, and a lock mechanism 7 as illustrated in FIG. 3.

The first movable portion 51 is a member arranged forward of the head member 37 and configured to support the projection lens 36. The projection lens 36 is fixed to the first movable portion 51 by a bayonet structure using a leaf spring or the like, screws, or the like.

The first movable portion 51 is configured to be movable in the vertical direction (±Z direction) orthogonal to the optical axis 36j together with the projection lens 36 with respect to the head member 37 by the rotation of the dial 61. The first movable portion 51 is configured to be movable freely between the upper restricting portion 371 and the lower restricting portion 372 (a vertical movable range).

The second movable portion is arranged between the head member 37 and the first movable portion 51. The second movable portion guides the movement of the first movable portion 51 in the vertical direction (±Z direction) and is configured to be movable in the lateral direction (±X direction) orthogonal to the optical axis 36j together with the first movable portion 51 by the rotation of the dial 161. In other words, the projection lens 36 supported by the first movable portion 51 is configured to be movable in the vertical direction with respect to the second movable portion, and is configured to be movable in the lateral direction together with the second movable portion. The second movable portion is configured to be movable freely between a range restricted by the restricting portion (not illustrated) in the lateral direction provided on the head member 37 (lateral movable range).

Figure 4:
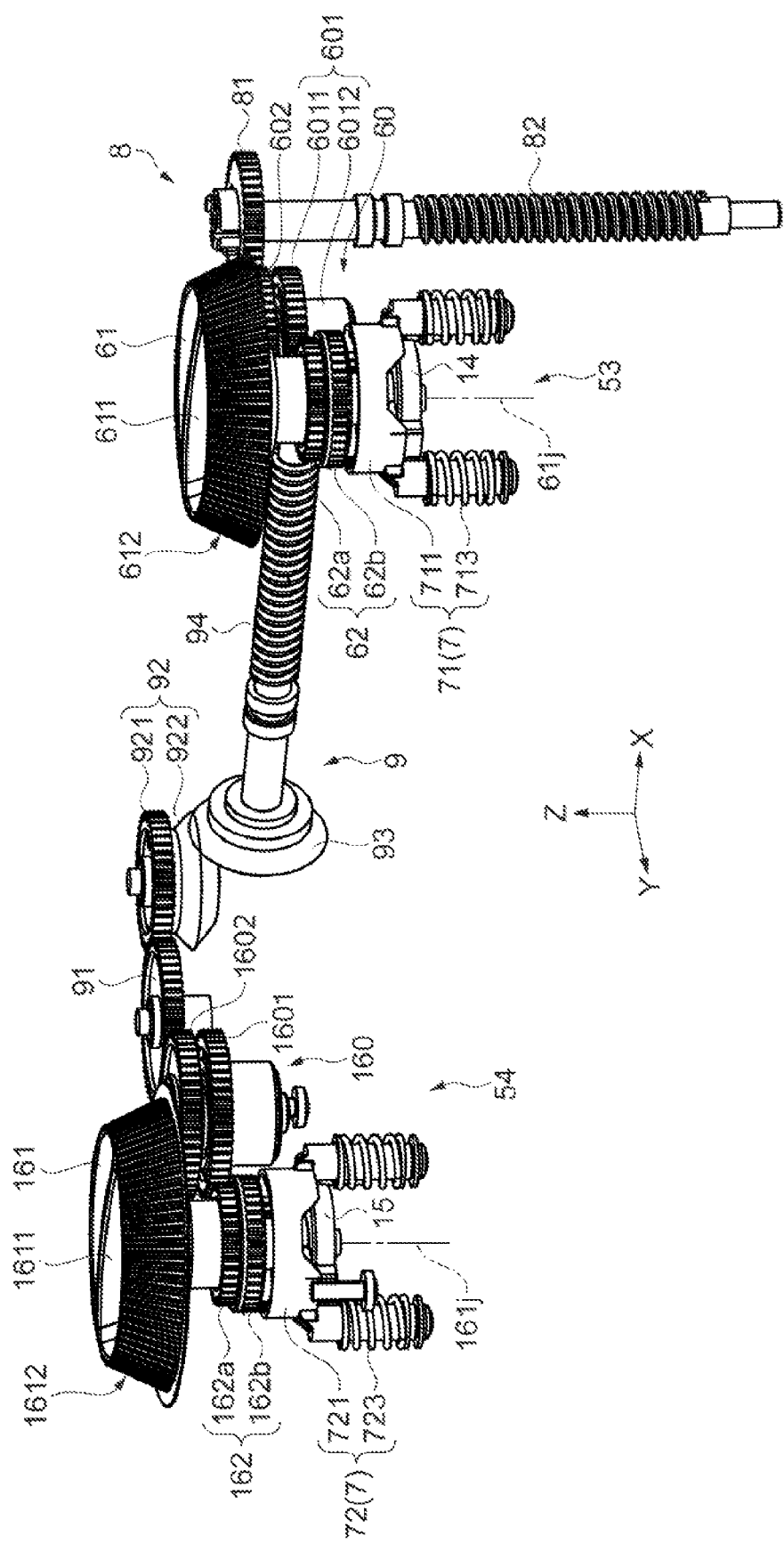
FIG. 4 is a perspective view of a first gear train mechanism and a second gear train mechanism of the embodiment.
Figure 5:
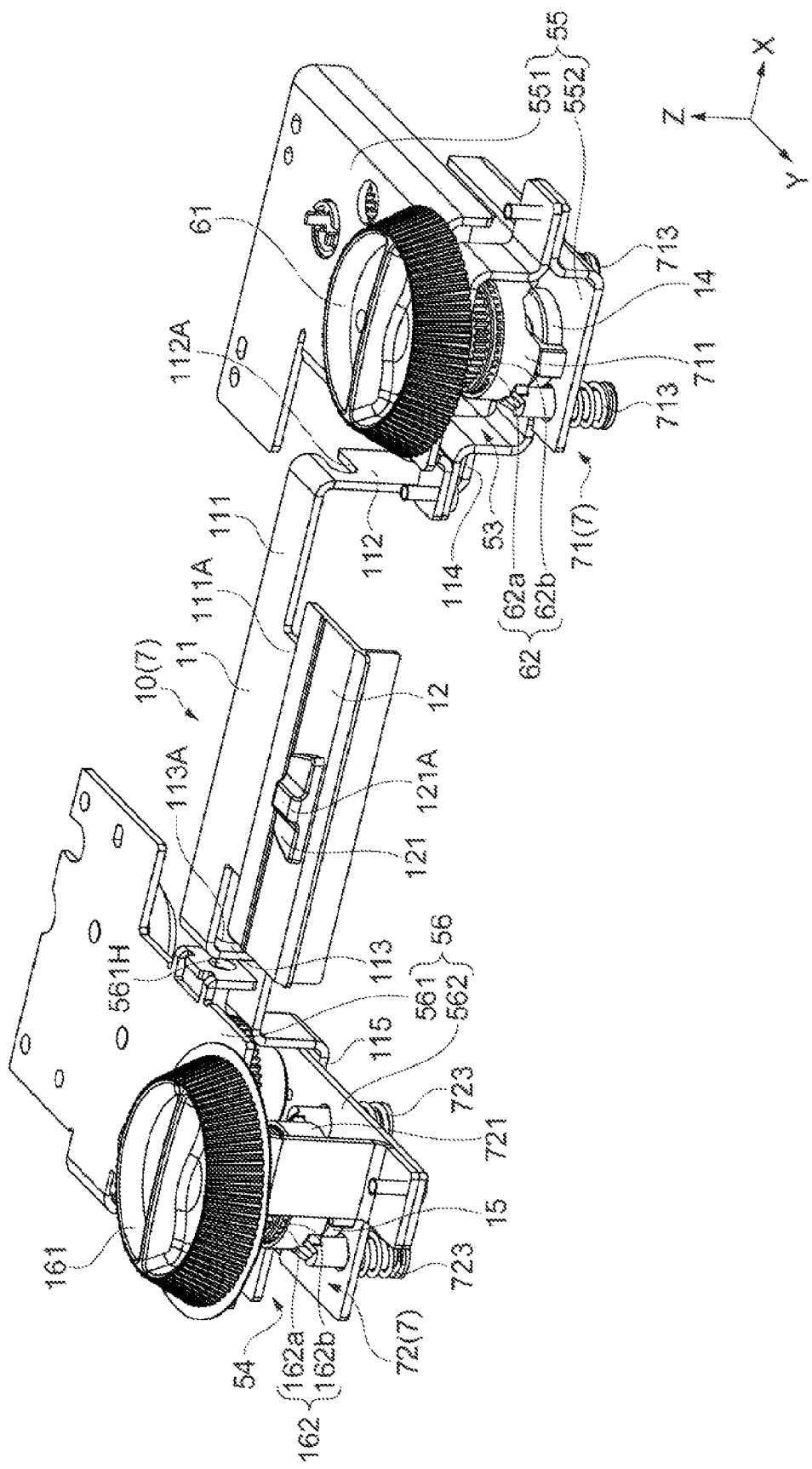
FIG. 5 is a perspective view illustrating parts of the first gear train mechanism, the second gear train mechanism, and a lock mechanism of the embodiment.

FIG. 4 and FIG. 5 are perspective views illustrating parts of the first gear train mechanism 53, the second gear train mechanism 54, and the lock mechanism 7. Specifically, FIG. 4 is a drawing in which supporting portions 55 and 56 described later are omitted from the first gear train mechanism 53 and the second gear train mechanism 54, and FIG. 5 is a drawing in which parts of the members which constitute the first gear train mechanism 53 and the second gear train mechanism 54 are omitted.

The first gear train mechanism 53 is a mechanism configured to move the first movable portion 51 in the vertical direction, and includes a drive gear 62 as a drive unit, a switching mechanism 60, a transmitting unit 8, and the supporting portion 55 in addition to the dial 61 as illustrated in FIG. 4 and FIG. 5.

The dial 61 transmits a drive force for moving the first movable portion 51 in the vertical direction by being rotated by a user. The dial 61 is arranged on the upper side in the vicinity of an end portion on the +X side of the lens shift mechanism 5 as illustrated in FIG. 3.

The dial 61 has a shape such as a conical shape from which a distal end portion is cut off, and is arranged so as to be rotatable about a center axis of rotation 61*j* extending along the vertical direction as illustrated in FIG. 4. The dial 61 is provided with a depression on an upper surface thereof, that is, on one end portion in the direction of the center axis of rotation 61*j*, and a rib 611 which allows the user to pinch is formed at a center portion of the depression. Then, the dial 61 is formed with a patterned indent for preventing slippage when being operated by the user on an outer peripheral portion (side surface 612) apart from the center axis of rotation 61*j*.

The dial 61 is arranged so that the rib 611 is exposed on the upper side of the exterior housing 2 and part of the side surface 612 is exposed on the front side of the exterior housing 2 (the side on which the projection lens 36 projects light) as illustrated in FIG. 2. Then, the dial 61 is formed so as to allow the rotating operation with the rib 611 pinched (upper surface operation) and the rotating operation (side surface operation) by pressing the side surface 612 in the direction of tangent thereof.

The drive gear 62 is arranged on the lower side of the dial 61 so as to be centered at the center axis of rotation 61*j* of the dial 61, and includes an upper gear 62*a* positioned on the dial 61 side and a lower gear 62*b* stacked below the upper gear 62*a* as illustrated in FIG. 4. The outer diameter of the lower gear 62*b* is formed to be larger than the outer diameter of the upper gear 62*a*.

Then, the dial 61 and the drive gear 62 are assembled so as to rotate integrally, and the drive force generated by the rotating operation of the dial 61 is transmitted to the drive gear 62 and the drive gear 62 is rotated together with the dial 61. The lower gear 62*b* corresponds to a first rotating portion locked by a first locking member 711 described later.

The switching mechanism 60 and the transmitting unit 8 are configured to be capable of transmitting the drive force from the drive gear 62 to the first movable portion 51.

The switching mechanism 60 is arranged on the rear side of the drive gear 62 (−Y side) as illustrated in FIG. 4.

Although the configuration of the switching mechanism 60 will be described later in detail, the switching mechanism 60 includes a first gear 601 engaging the upper gear 62*a* of the drive gear 62 and a second gear 602 engaging the transmitting unit 8. The switching mechanism 60 is configured to be in a transmitting state which allows the transmitting unit 8 to transmit the drive force from the drive gear 62 in a range in which the first movable portion 51 is movable, and to be in a non-transmitting state which restricts the transmitting unit 8 from transmitting the drive force from the drive gear 62 when the first movable portion 51 is in abutment with the upper restricting portion 371 and the lower restricting portion 372 and the movement is restricted.

The transmitting unit 8 is provided with a gear 81 and a lead screw 82 engaging the second gear 602 of the switching mechanism 60 as illustrated in FIG. 4.

The lead screw 82 is formed with a screw groove on the outer peripheral portion thereof and one end portion thereof is inserted through an insertion hole provided at a center portion of the gear 81 and a portion between the gear 81 and the screw groove and the other end portion is supported by the head member 37. Then, the gear 81 and the lead screw 82 are arranged so as to be integrally rotatable about the same center axis of rotation along the vertical direction.

The supporting portion 55 supports the dial 61, the drive gear 62, the switching mechanism 60, and the gear 81, and is mounted to the head member 37. The supporting portion 55 is provided with an upper supporting member 551 and a lower supporting member 552 positioned downward of the upper supporting member 551 as illustrated in FIG. 5.

The upper supporting member 551 and the lower supporting member 552 are formed of a metal sheet by press work, the dial 61 is positioned above the upper supporting member 551, and the drive gear 62, the switching mechanism 60, and the gear 81 are supported so as to be positioned between the upper supporting member 551 and the lower supporting member 552. The upper supporting member 551 and the lower supporting member 552 are fixed with screws. The lower supporting member 552 has a function to support the lock mechanism 7, and the configuration of this function will be described later in detail.

A towing member (not illustrated) configured to tow the first movable portion 51 engages the lead screw 82, and the towing member is provided with a projecting portion which is locked by the first movable portion 51 in the vertical direction.

When the dial 61 is rotated, the lead screw 82 rotates via the drive gear 62, the switching mechanism 60, and the gear 81, and the towing member engaging the lead screw 82 moves in accordance with the direction of rotation of the dial 61. Consequently, the first movable portion 51, that is, the projection lens 36 supported by the first movable portion 51 moves in the vertical direction. The lens shift mechanism 5 of the embodiment is configured in such a manner that when the dial 61 is rotated clockwise when viewed from the top, the projection lens 36 moves upward, and when the dial 61 is rotated counterclockwise, the projection lens 36 is moved downward.

The second gear train mechanism 54 is a mechanism configured to move the first movable portion 51, that is, the projection lens 36 in the lateral direction by moving the second movable portion in the lateral direction, and includes the drive gear 162 as a drive unit, a switching mechanism 160, a transmitting unit 9, and the supporting portion 56 in addition to the dial 161 as illustrated in FIG. 4 and FIG. 5.

The dial 161 is formed into the same shape as the dial 61 and is arranged on the upper side near the end portion of the lens shift mechanism 5 on the −X side so as to be rotatable about a center axis of rotation 161*j* (see FIG. 4) extending along the vertical direction in the same manner as the dial 61 as illustrated in FIG. 3. Then, a drive force for moving the second movable portion in the lateral direction is transmitted to the dial 161 by the rotating operation of the user.

The dial 161 is arranged so that a rib 1611 is exposed on the upper side of the exterior housing 2 and part of a side surface 1612 is exposed on the front side of the exterior housing 2 as illustrated in FIG. 2 in the same manner as the dial 61. Then, the dial 161 is configured so as to be rotated by the upper surface operation or the side surface operation in the same manner as the dial 61.

The drive gear 162 is formed in the same shape as the drive gear 62, includes an upper gear 162*a* and a lower gear 162*b*, and is assembled so as to rotate integrally with the dial 161. A drive force generated by the rotating operation of the dial 161 is transmitted to the drive gear 162 and the drive gear 162 is rotated together with the dial 161. The lower gear 162*b* corresponds to a second rotating portion locked by a second locking member 721 described later.

The switching mechanism 160 and the transmitting unit 9 are configured to be capable of transmitting the drive force from the drive gear 162 to the second movable portion.

The switching mechanism 160 is arranged on the rear side of the drive gear 162 (−Y side) as illustrated in FIG. 4.

The switching mechanism 160 is composed of common members with the switching mechanism 60, and includes a first gear 1601 engaging the upper gear 162a of the drive gear 162 and a second gear 1602 engaging the transmitting unit 9. The switching mechanism 160 is configured to be in a transmitting state which allows the transmitting unit 9 to transmit the drive force from the drive gear 162 in a range in which the second movable portion is movable, and to be in a non-transmitting state which restricts the transmitting unit 9 from transmitting the drive force from the drive gear 162 when the second movable portion is in abutment with the restricting portion (not illustrated) and the movement is restricted.

The transmitting unit 9 includes a gear 91, a stacked gear 92, a bevel gear 93, and a lead screw 94 as illustrated in FIG. 4.

The gear 91 is configured to engage the second gear 1602 of the switching mechanism 160.

The stacked gear 92 includes a gear 921 configured to engage the gear 91, and a bevel gear 922 having the same center axis of rotation as the gear 921 and provided below the gear 921.

The bevel gear 93 is formed so as to engage the bevel gear 922, and is arranged so that the center axis of rotation extends along the lateral direction.

The bevel gear 93 is formed with an insertion hole at a center portion thereof, one of end portions of the lead screw 94 is inserted into the insertion hole, and the bevel gear 93 and the lead screw 94 have the same center axis extending in the lateral direction and are configured to be rotatable integrally with each other.

The lead screw 94 is formed with a screw groove on the outer peripheral portion thereof, and a portion between the bevel gear 93 and the screw groove and the end portion on the side opposite to the side where the bevel gear 93 is arranged are supported by the head member 37.

The supporting portion 56 supports the dial 161, the drive gear 162, the switching mechanism 160, the gear 91, and the stacked gear 92, and is mounted to the head member 37. The supporting portion 56 is provided with an upper supporting member 561 and a lower supporting member 562 positioned below the upper supporting member 561 as illustrated in FIG. 5.

The upper supporting member 561 and the lower supporting member 562 are formed of a metal sheet by press work, the dial 161 is positioned above the upper supporting member 561, and the drive gear 162, the switching mechanism 160, the gear 91, and the stacked gear 92 are supported so as to be positioned between the upper supporting member 561 and the lower supporting member 562. The upper supporting member 561 and the lower supporting member 562 are fixed with screws. The lower supporting member 562 has a function to support the lock mechanism 7 in the same manner as the lower supporting member 552, and the configuration of this function will be described later in detail.

A towing member (not illustrated) configured to tow the second movable portion engages the lead screw 94, and the towing member is provided with a projecting portion which is locked by the second movable portion in the lateral direction.

When the dial 161 is rotated, the lead screw 94 rotates via the drive gear 162, the switching mechanism 160, the gear 91, the stacked gear 92, and the bevel gear 93, and the towing member engaging the lead screw 94 moves in accordance with the direction of rotation of the dial 161. Consequently, the second movable portion, that is, the projection lens 36 supported by the second movable portion via the first movable portion 51 moves in the lateral direction. The lens shift mechanism 5 of the embodiment is configured in such a manner that when the dial 161 is rotated clockwise when viewed from the top, the projection lens 36 moves in the +X direction, and when the dial 161 is rotated counterclockwise, the projection lens 36 is moved in the −X direction.

Configuration of Switching Mechanism

Here, the switching mechanisms 60 and 160 will be described in detail. Since the switching mechanisms 60 and 160 are configured to be common, the switching mechanism 60 is focused for description here.

Figure 6A:
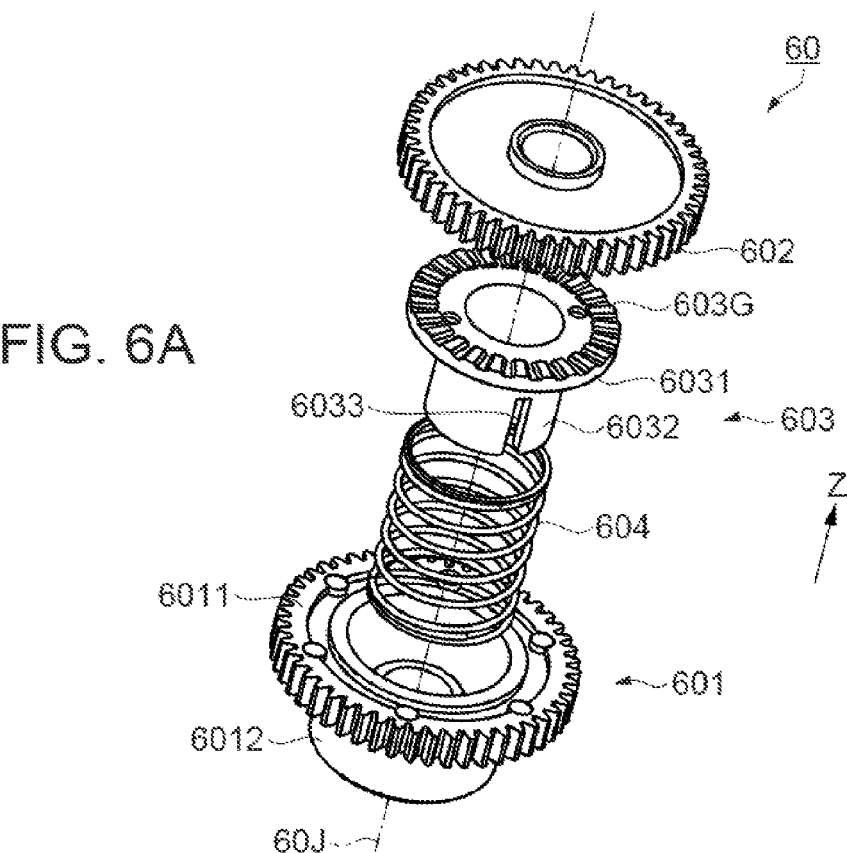
FIG. 6A is an exploded perspective view of a switching mechanism of the embodiment.
Figure 6B:
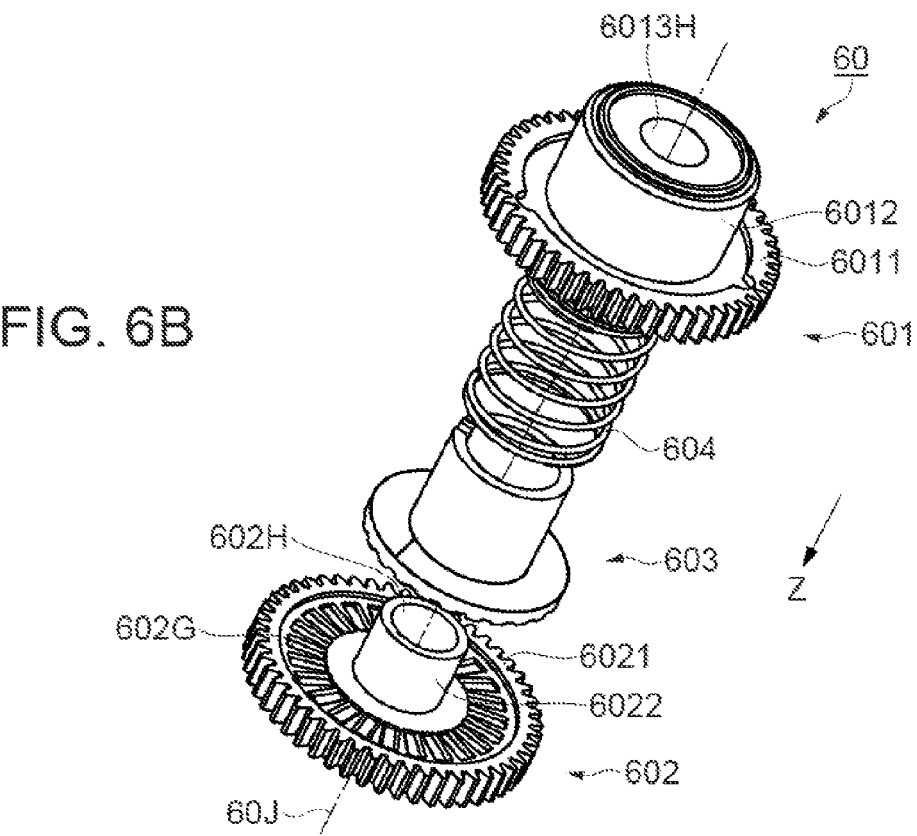
FIG. 6B is an exploded perspective view of the switching mechanism of the embodiment.
Figure 7:
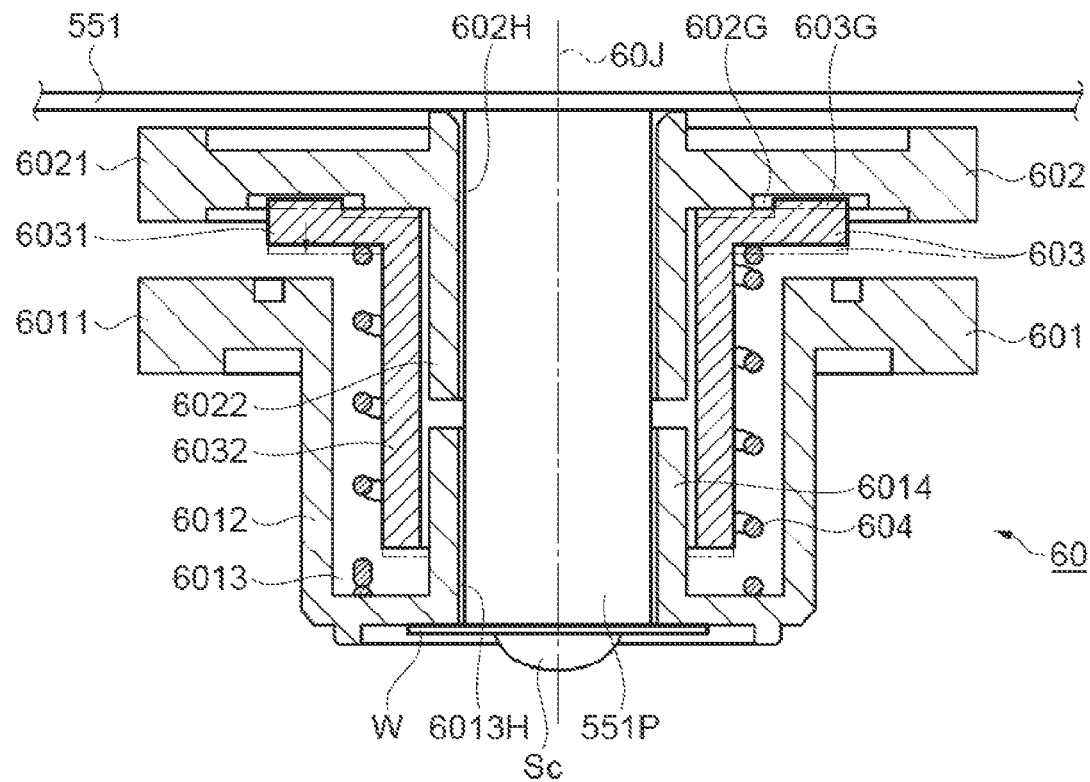
FIG. 7 is a cross-sectional view of the switching mechanism of the embodiment.

FIGS. 6A and 6B are exploded perspective views of the switching mechanism 60, FIG. 6A is a drawing viewed from obliquely above, and FIG. 6B is a drawing viewed from obliquely below. FIG. 7 is a cross-sectional view of the switching mechanism 60.

The switching mechanism 60 includes a switching member 603 and a coil spring 604 as an urging portion in addition to the first gear 601 and the second gear 602 as illustrated in FIGS. 6A and 6B.

As illustrated in FIG. 6A, the first gear 601 includes a center axis of rotation 60J and includes a tooth shape forming portion 6011 having teeth engaging the upper gear 62a (see FIG. 4) of the drive gear 62 formed thereon and a projecting portion 6012 projecting from the lower side (−Z side) of the tooth shape forming portion 6011.

The projecting portion 6012 is centered at the center axis of rotation 60J, and is formed into a column shape having an outer diameter smaller than the outer diameter of the tooth shape forming portion 6011.

The projecting portion 6012 is provided with a storage 6013 configured to store the coil spring 604 in a manner partly projecting in the direction of compression at a center portion thereof as illustrated in FIG. 7.

The storage 6013 is formed with a round hole 6013H centered at the center axis of rotation 60J on a bottom surface and the round hole 6013H is provided with a cylindrical-shaped guiding portion 6014 centered at the center axis of rotation 60J and extending to the tooth shape forming portion 6011 side as illustrated in FIG. 7. The guiding portion 6014 is formed to have a height substantially half a depth of the storage 6013 as illustrated in FIG. 7.

The first gear 601 engaging the upper gear 62a of the drive gear 62 is arranged so that the projecting portion 6012 is positioned below the tooth shape forming portion 6011 as illustrated in FIG. 4. In other words, the first gear 601 is arranged so that the projecting portion 6012 is positioned on the side opposite to the side where the dial 61 is arranged with respect to the tooth shape forming portion 6011.

As illustrated in FIG. 6B, the second gear 602 includes a center axis of rotation coaxial with the center axis of rotation 60J, is formed with a tooth shape forming portion 6021 including teeth engaging a gear 81 (see FIG. 4) and a projecting portion 6022 projecting from below (−Z direction) of the tooth shape forming portion 6021, and is formed with a round hole 602H centered at the center axis of rotation 60J at a center thereof.

The tooth shape forming portion 6021 is formed to have an outer diameter equivalent to that of the tooth shape forming portion 6011 of the first gear 601.

The projecting portion 6022 is formed into a cylindrical shape having a size equivalent to the guiding portion 6014 of the first gear 601, and the second gear 602 is arranged so that the projecting portion 6022 faces the guiding portion 6014 as illustrated in FIG. 7.

The tooth shape forming portion 6021 is provided with a first tooth portion 602G on the projecting portion 6022 side (the side facing the switching member 603) as illustrated in FIG. 6B.

A plurality of the first tooth portions 602G are disposed on a circumference having a center at the center axis of rotation 60J equidistantly.

Figure 8:
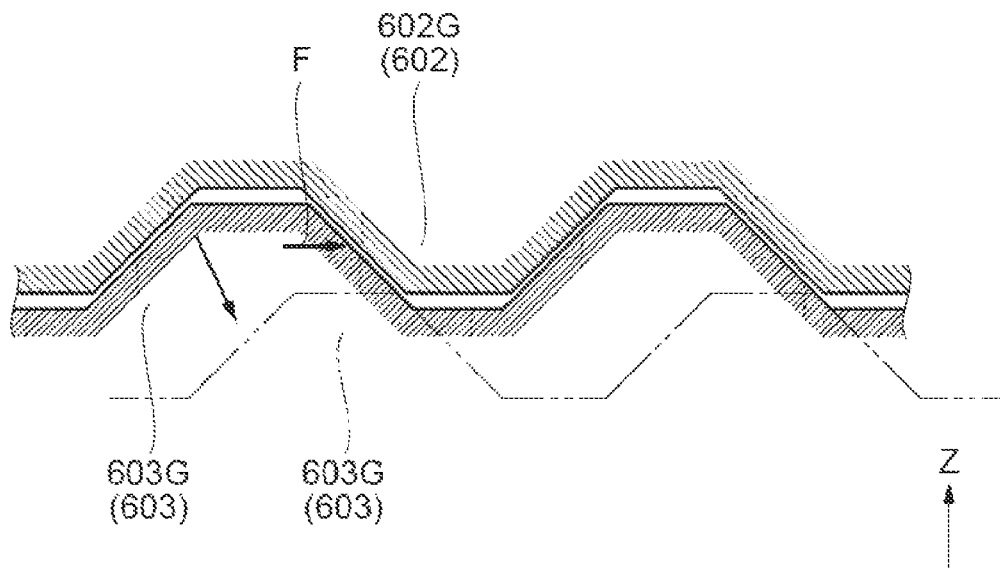
FIG. 8 is a partial cross-sectional view diagrammatically illustrating a second gear and a switching member of the embodiment.

FIG. 8 is a partial cross-sectional view schematically illustrating the second gear 602 and the switching member 603.

The first tooth portion 602G is formed radially with respect to the center at the center axis of rotation 60J, and a cross section extending along the circumferential direction is formed into a trapezoidal shape as illustrated in FIG. 8.

The switching member 603 includes a center axis of rotation coaxial with the center axis of rotation 60J, and is arranged movably between the first gear 601 and the second gear 602 along the center axis of rotation 60J as illustrated in FIGS. 6A and 6B.

The switching member 603 includes a column-shaped flange portion 6031, and a cylindrical portion 6032 projecting from the lower side (−Z side) of the flange portion 6031 as illustrated in FIG. 6A.

The flange portion 6031 has an outer diameter smaller than the outer diameter of the tooth shape forming portion 6021, and is formed with a second tooth portion 603G engageable with the first tooth portion 602G on the surface on the second gear 602 side.

The second tooth portion 603G is formed radially with respect to the center at the center axis of rotation 60J in the same manner as the first tooth portion 602G, and a cross section extending along the circumferential direction is formed into a trapezoidal shape as illustrated in FIG. 8. In this manner, the first tooth portion 602G and the second tooth portion 603G are formed into a trapezoidal shape in cross section so as to engage each other in the center axis of rotation 60J direction and in the direction of rotation. In other words, the first tooth portion 602G and the second tooth portion 603G engage each other and have inclined portions which allow rotation of both of the second gear 602 and the switching member 603. Surfaces of the first tooth portion 602G and the second tooth portion 603G engaging each other are each formed of a flat surface, so that the first tooth portion 602G and the second tooth portion 603G engage by surface contact.

The cylindrical portion 6032 is formed to have an outer diameter smaller than the inner diameter of the coil spring, and to have an inner diameter larger than the outer diameters of the guiding portion 6014 and the projecting portion 6022 as illustrated in FIG. 7. Then, the switching member 603 is arranged between the first gear 601 and the second gear 602 with the guiding portion 6014 and the projecting portion 6022 inserted through the cylindrical portion 6032.

As illustrated in FIG. 6A, the cylindrical portion 6032 is provided with a slit 6033 notched along the center axis of rotation 60J. The slit 6033 is formed so as to engage a projecting portion, not illustrated, provided on the first gear 601, and the switching member 603 is locked by the first gear 601 in the direction of rotation. In other words, the switching member 603 rotates together with the first gear 601 in association with the rotation of the first gear 601.

The coil spring 604 is arranged between the first gear 601 and the switching member 603. Specifically, the coil spring 604 is stored in the storage 6013 of the first gear 601, abuts against a bottom portion of the first gear 601 at one end portion thereof and against a surface of the flange portion 6031 opposite to the second tooth portion 603G at the other end portion thereof, and urges the switching member 603 in the second gear 602 side as illustrated in FIG. 7.

The switching mechanism 60 is axially supported by a supporting pin 551P provided on the upper supporting member 551 being inserted through the round holes 6013H and 602H as illustrated in FIG. 7. Then, the switching mechanism 60 is mounted on the upper supporting member 551 with a screw Sc tightened on a distal end portion of the supporting pin 551P via a spring washer W. The switching member 603 is urged by the coil spring 604, so that the second tooth portion 603G engages the first tooth portion 602G of the second gear 602.

Action of Switching Mechanism

Subsequently, an action of the switching mechanism 60 will be described.

The switching mechanism 60 maintains a state in which the first tooth portion 602G and the second tooth portion 603G engage each other in the vertical movable range of the first movable portion 51, and transmits a drive force from the dial 61 from the first gear 601 to the second gear 602. In other words, the switching mechanism 60 is in a transmitting state in which the transmitting unit 8 is caused to transmit the drive force from the dial 61 in the vertical movable range of the first movable portion 51.

Specifically, when the dial 61 is rotated in one direction (clockwise when viewed from above), the drive force is transmitted to the first gear 601 via the drive gear 62. This drive force is transmitted also to the switching member 603 locked by the first gear 601 in the direction of rotation.

The second tooth portion 603G, engaging the first tooth portion 602G, presses the first tooth portion 602G to rotate the second gear 602 by a drive force F transmitted to the switching member 603 as illustrated in FIG. 8. In this manner, the switching mechanism 60 maintains a state in which the first tooth portion 602G and the second tooth portion 603G engage each other in the vertical movable range of the first movable portion 51, and transmits the drive force F from the first gear 601 to the second gear 602.

Then, the rotation of the second gear 602 is transmitted to the lead screw 82 via the gear 81 (see FIG. 4), and consequently, the first movable portion 51 and the projection lens 36 move upward via the towing member.

When the dial 61 is rotated in the other direction (counterclockwise when viewed from above), the drive force is transmitted to the first movable portion 51 in the same manner, and the first movable portion 51 and the projection lens 36 move downward.

In contrast, when the first movable portion 51 abuts against the upper restricting portion 371 and the lower restricting portion 372 of the head member 37, the first movable portion 51 reaches the limit of the movable range and hence is brought into a state in which further movement is restricted (a movement restricted state), and the switching mechanism 60 is brought into a non-transmitting state in which the transmitting unit 8 is not allowed to transmit the drive force in the direction corresponding to the restricted direction of the first movable portion 51 transmitted from the dial 61.

Specifically, in the movement restricted state, the lead screw 82 and the gear 81 are brought into a state of being restricted from rotating in the direction corresponding to the direction in which the first movable portion 51 is restricted (the restricted direction), and the second gear 602 engaging the gear 81 is also brought into a state of being restricted from rotating in the direction corresponding to the restricted direction.

When the dial 61 is rotated in the direction corresponding to the restricted direction in the state in which the second gear 602 is restricted from rotating in the direction corresponding to the restricted direction, the second tooth portion 603G presses the first tooth portion 602G of the second gear 602 by the drive force F transmitted to the switching member 603 via the drive gear 62 and the first gear 601. However, since the rotation of the second gear 602 is restricted, the switching member 603 moves in the direction away from the second gear 602 with the second tooth portion 603G sliding on the surface of the first tooth portion 602G against an urging force of the coil spring 604 (illustrated by a double-dot chain line in FIG. 7 and FIG. 8).

When the dial 61 is further rotated, the switching member 603 repeats the action of the second tooth portion 603G which moves to climb over the first tooth portion 602G, engage the first tooth portion 602G adjacent thereto by being urged by the coil spring 604, and climb over the first tooth portion 602G adjacent thereto again. Therefore, the switching member 603 idles together with the first gear 601, and the switching mechanism 60 restricts the drive force from the dial 61 from transmitting from the first gear 601 to the second gear 602, that is, does not allow the transmitting unit 8 to transmit the drive force. Therefore, an excessive load applied to the second gear 602 restricted from rotating, the gear 81, the lead screw 82, and the first movable portion 51 restricted from moving is suppressed.

More specifically, a force restricting the rotation of the second gear 602 engaging the transmitting unit 8 is larger than a frictional force generating between the first tooth portion 602G and the second tooth portion 603G when in the non-transmitting state, and hence the second tooth portion 603G cannot maintain the engagement with respect to the first tooth portion 602G, so that the switching member 603 moves away from the second gear 602 against the urging force of the coil spring 604. Accordingly, the rotation of the second gear 602 is restricted.

In this movement restricted state, when the dial 61 is rotated in the other direction (a direction opposite to the direction corresponding to the restricted direction), the second gear 602 is not restricted from rotating in a direction corresponding to this direction, and hence the second tooth portion 603G presses the first tooth portion 602G by the drive force from the dial 61 to rotate the second gear 602. Then, the first movable portion 51 moves in a direction opposite to the restricted direction.

In this manner, the switching mechanism 60 is configured to switch between the transmitting state which allows the transmitting unit 8 to transmit the drive force from the dial 61 in the movable range of the first movable portion 51 in the vertical direction, and the non-transmitting state which restricts the transmitting unit 8 from transmitting the drive force in the movement restricted state of the first movable portion 51 in the vertical direction.

The switching mechanism 160 acts in the same manner as the switching mechanism 60, and is configured to switch between the transmitting state which allows the transmitting unit 9 to transmit the drive force from the dial 161 in the movable range of the second movable portion in the lateral direction, and the non-transmitting state which restricts the transmitting unit 9 from transmitting the drive force in the movement restricted state of the second movable portion in the lateral direction.

Configuration of Lock Mechanism

Here, the lock mechanism 7 will be described in detail.

The lock mechanism 7 is configured to be capable of switching between a locked state in which the lower gear 62b as the first rotating portion is locked and the lower gear 162b as the second rotating portion is locked and an unlocked state in which the locked state is released. In other words, the lock mechanism 7 is configured to restrict the rotating operations of the dials 61 and 161 by locking the lower gears 62b and 162b in the locked state, and prevent the position of the projection lens 36 from being changed, that is, fix the position of the projection lens 36. Then, the lock mechanism 7 is configured to release locking between the lower gears 62b and 162b to allow the rotating operation of the dials 61 and 161 and allow the position of the projection lens 36 to be changed in the unlocked state.

The lock mechanism 7 is provided with a first lock unit 71 configured to lock the rotation of the lower gear 62b, a second lock unit 72 configured to lock the rotation of the lower gear 162b, and a lever mechanism 10 configured to allow the first lock unit 71 and the second lock unit 72 to act as illustrated in FIG. 5.

The first lock unit 71 and the second lock unit 72 are composed of common members, and here, the description will be given by focusing on the first lock unit 71.

Figure 9:
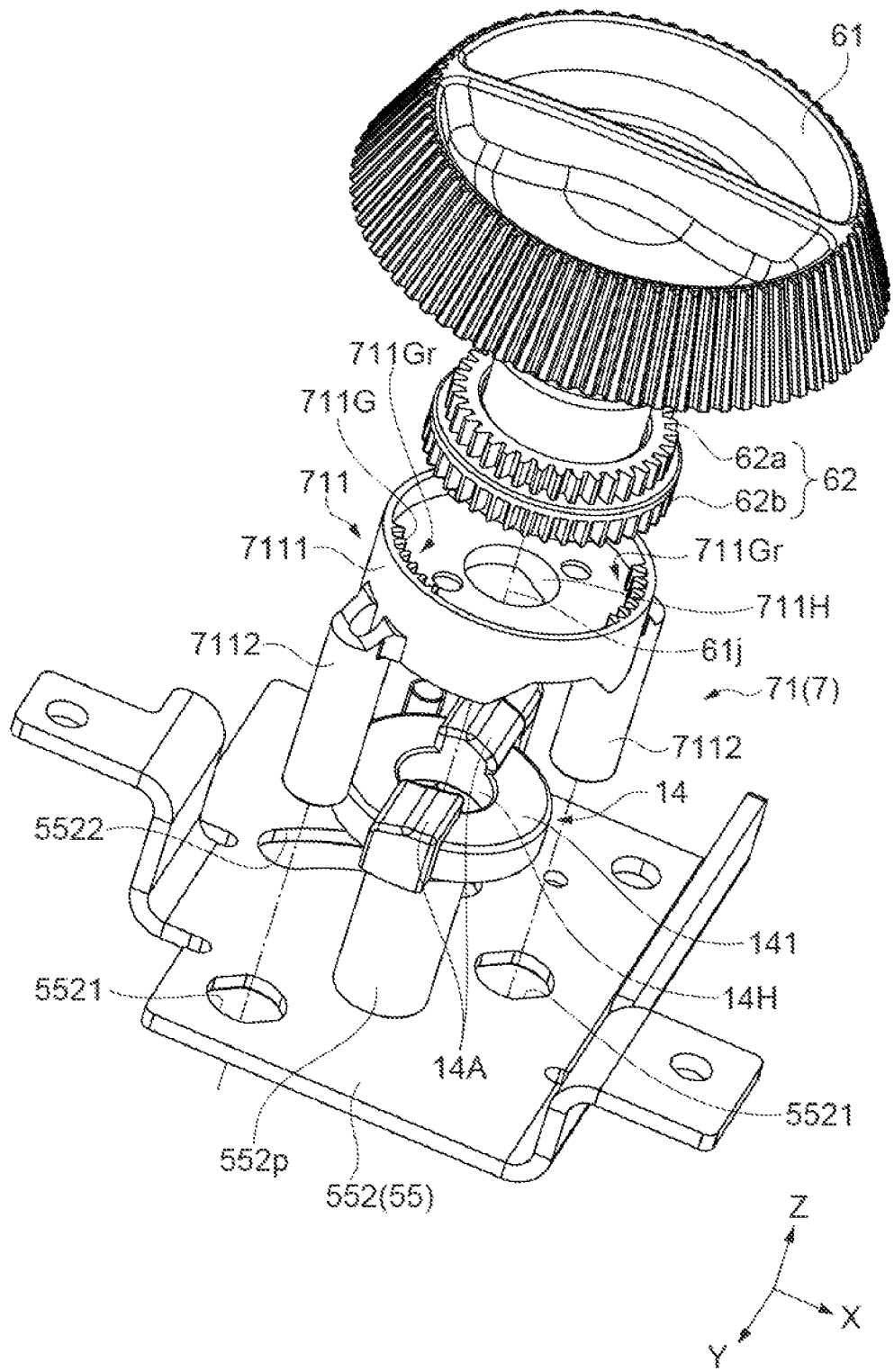
FIG. 9 is an exploded perspective view of a first lock portion, a drive unit, and a lower supporting member of the embodiment.
Figure 10:
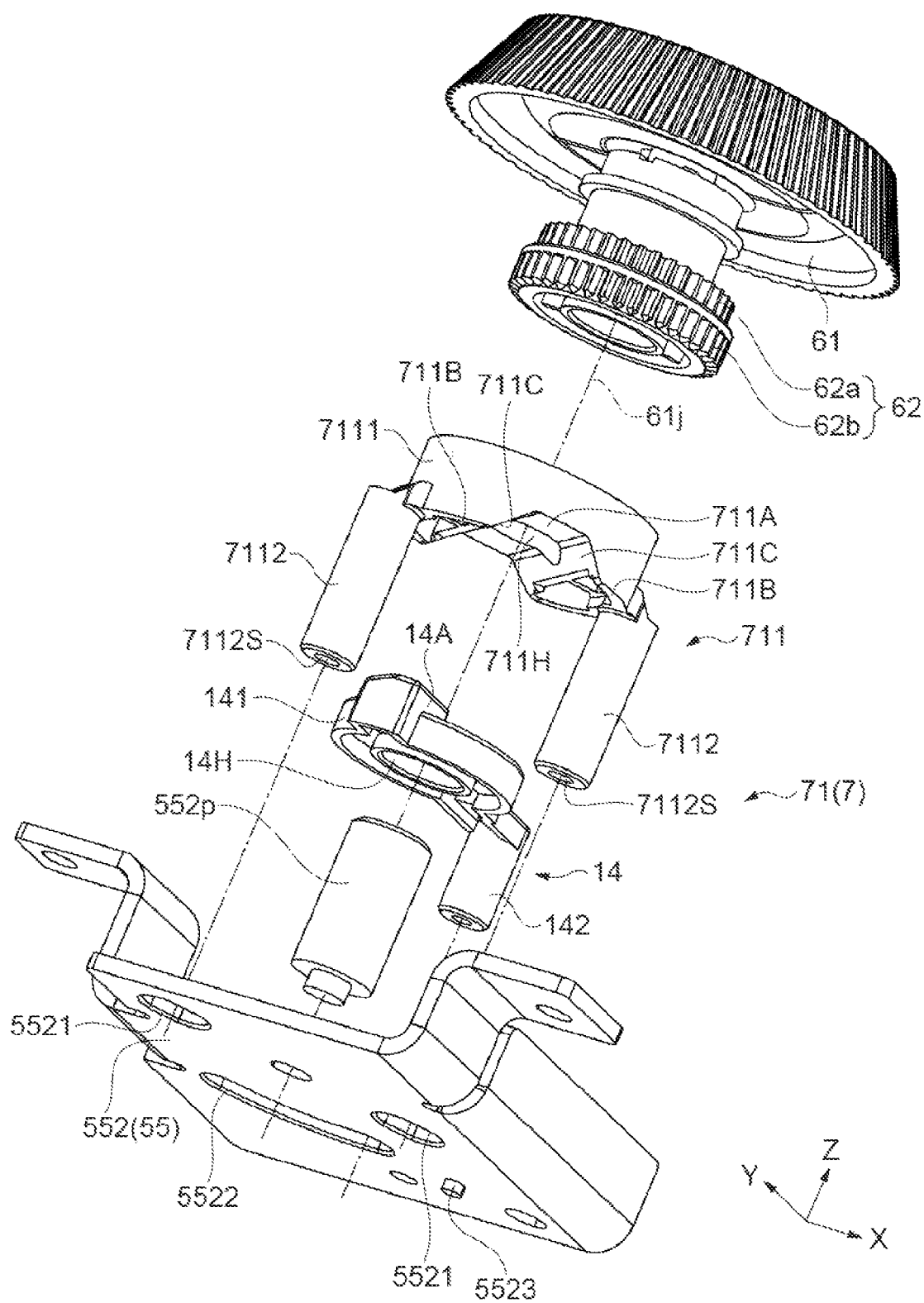
FIG. 10 is an exploded perspective view of the first lock portion, the drive unit, and the lower supporting member of the embodiment.
Figure 11:
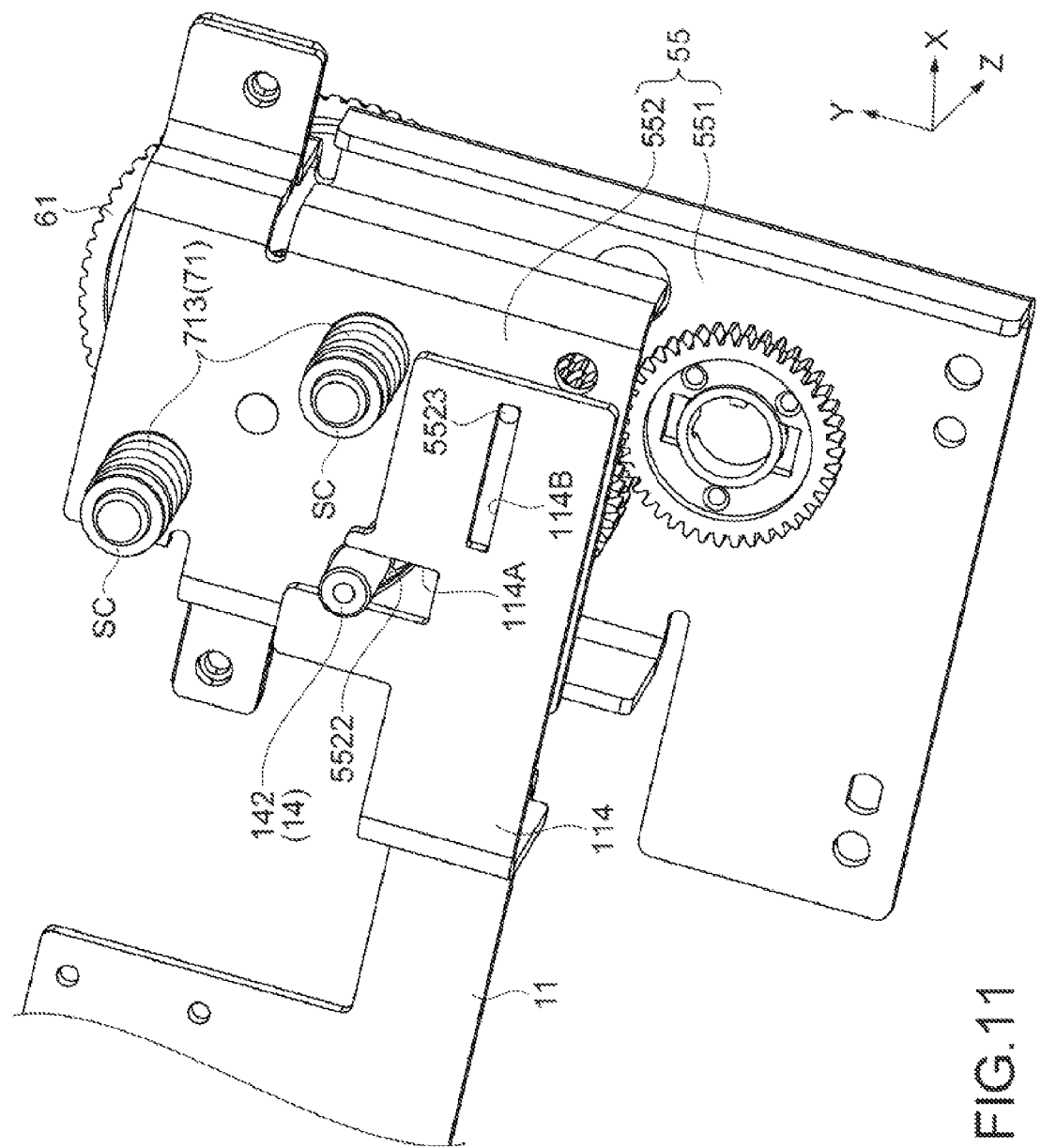
FIG. 11 is a perspective view of the first lock portion, the drive unit, and the supporting member of the embodiment viewed from obliquely below.

FIG. 9 and FIG. 10 are exploded perspective views of the dial 61, the drive gear 62, the first lock unit 71, and the lower supporting member 552, and FIG. 9 is a drawing viewed from obliquely above and FIG. 10 is a drawing viewed from obliquely below. FIG. 11 is a perspective view of the dial 61, the first lock unit 71, and the supporting portion 55 viewed from obliquely below.

The first lock unit 71 includes the first locking member 711 and a coil spring 713 as an urging portion as illustrated in FIG. 9 to FIG. 11.

The first locking member 711 is arranged below the drive gear 62 as illustrated in FIG. 9 and FIG. 10. The first locking member 711 is configured to be movable along the center axis of rotation 61j, and lock the lower gear 62b at a predetermined position in the direction of the center axis of rotation 61j.

The first locking member 711 includes a column-shaped body portion 7111 and a pair of projecting portions 7112 projecting downward from the body portion 7111.

The body portion 7111 is formed with a depression on an upper surface thereof so that the lower gear 62b can be inserted, and the depression is provided with a tooth portion 711G configured to engage the lower gear 62b on an inner peripheral surface thereof as illustrated in FIG. 9.

The tooth portion 711G is formed on the inner peripheral surface of the depression of the body portion 7111 except for some parts, and hence three tooth groups 711Gr each composed of a plurality of the tooth portions 711G are provided equidistantly at 120° intervals along the circumference centered at the center axis of rotation 61j as illustrated in FIG. 9 (in FIG. 9, one of the tooth groups 711Gr is not illustrated. The tooth portions 711G are formed so as to engage the lower gear 62b in a good balance centered at the center axis of rotation 61j. The number of the tooth groups 711Gr is not limited to three, and four of the tooth groups 711Gr may be provided equidistantly at 90° in the circumferential direction centered at the center axis of rotation 61j, for example. A configuration in which the tooth portion 711G is provided over the entire circumference of the inner peripheral surface of the depression of the body portion 7111 is also applicable.

The depression of the body portion 7111 is formed with a round hole 711H centered at the center axis of rotation 61j on a bottom surface thereof.

The body portion 7111 is provided with a depression 711A and projections 711B on a lower surface thereof as illustrated in FIG. 10.

The depression 711A extends in a direction passing through the center axis of rotation 61*j* and extending orthogonally to the center axis of rotation 61*j*, and the projections 711B are provided on both sides of the depression 711A. An oblique surface 711C is formed between the depression 711A and the projections 711B, and the lower surface of the body portion 7111 is formed so that the depression 711A and the projections 711B are smoothly continued by the oblique surface 711C.

The pair of projecting portions 7112 are portions inserted into the lower supporting member 552, and have a function to restrict the rotation of the first locking member 711 and guide the movement of the first locking member 711 in the center axis of rotation 61*j*.

The pair of projecting portions 7112 are formed into a column shape as illustrated in FIG. 10, extend respectively downward from the projections 711B on the both sides of the depression 711A, and are provided with screw holes 7112S at distal end portions thereof. The pair of projections 711B, the oblique surface 711C, and the pair of projecting portions 7112 are formed so as to have a rotational symmetry through 180° with respect to the center axis of rotation 61*j*.

The lower supporting member 552 has a function to support the first lock unit 71 and a first moving member 14, described later, of the lever mechanism 10.

The lower supporting member 552 is provided with a supporting pin 552*p* centered at the center axis of rotation 61*j* on an upper surface thereof as illustrated in FIG. 9 and FIG. 10. The supporting pin 552*p* axially supports the first locking member 711 and the first moving member 14. The lower supporting member 552 is formed with insertion holes 5521 which allow insertion of the pair of projecting portions 7112 therethrough and an arcuate-shaped guide hole 5522 centered at the center axis of rotation 61*j*. The lower supporting member 552 is provided with a projection 5523 on a lower surface thereof as illustrated in FIG. 10.

The first locking member 711 is arranged on the upper surface side of the lower supporting member 552 via the first moving member 14. Specifically, the projecting portions 7112 of the first locking member 711 is inserted through the insertion holes 5521, and the supporting pin 552*p* is inserted through the round hole 711H. The first locking member 711 is supported by the lower supporting member 552 by the coil spring 713 arranged on the projecting portions 7112 projecting from the lower surface of the lower supporting member 552 and a screw SC (see FIG. 11) inserted into the screw hole 7112S. The coil spring 713 urges the first locking member 711 in the direction of the center axis of rotation 61*j*, specifically, in the direction in which the first locking member 711 is moved away from the lower gear 62*b* (the lower supporting member 552 side).

The second lock unit 72 is configured in the same manner as the first lock unit 71, and includes the second locking member 721 and a coil spring 723 as an urging portion as illustrated in FIG. 5. The lower supporting member 562 includes a supporting pin, insertion holes, a guide hole, and a projection similar to the supporting pin 552*p*, the insertion holes 5521, the guide hole 5522, and the projection 5523 provided on the lower supporting member 552, although detailed illustration is omitted.

The second locking member 721 is urged by the coil spring 723 and supported by the lower supporting member 562 in the same manner as the first locking member 711. The second locking member 721 is configured to be movable along the center axis of rotation 161*j*, and lock the lower gear 162*b* at a predetermined position.

The lever mechanism 10 is configured to move the first locking member 711 and the second locking member 721, and switch the locking members between the locked state and the unlocked state. The lever mechanism 10 includes the first moving member 14, a second moving member 15, a lever 11, a lever auxiliary member 12, and a shaft 13 (see FIG. 3) as illustrated in FIG. 5.

The first moving member 14 is arranged between the first locking member 711 and the lower supporting member 552, is rotated by the operation of the lever 11, and moves the first locking member 711 along the center axis of rotation 61*j* as illustrated in FIG. 5.

The second moving member 15 is arranged between the second locking member 721 and the lower supporting member 562, is configured to be rotated by the operation of the lever 11, and moves the second locking member 721 along the center axis of rotation 161*j* as illustrated in FIG. 5.

The first moving member 14 and the second moving member 15 are common members and here the first moving member 14 is focused for description.

The first moving member 14 includes a body portion 141 and a guide pin 142 as illustrated in FIG. 9 and FIG. 10.

The body portion 141 is formed into a column shape centered at the center axis of rotation 61*j*, and is formed with a round hole 14H centered at the center axis of rotation 61*j* at a center portion thereof, and a pair of pressing portions 14A projecting upward are formed on an upper surface thereof.

The pair of pressing portions 14A are portions for pressing the first locking member 711 in order to move the first locking member 711 toward the lower gear 62*b* along the center axis of rotation 61*j*, and are formed to have a size capable of coming into abutment with the depression 711A of the first locking member 711.

The guide pin 142 is a portion engaging the lever 11, extends downward from an edge portion of the lower surface of the body portion 141, and is formed into a column shape.

The first moving member 14 is inserted through the guide hole 5522 so that a distal end portion of the guide pin 142 projects from the lower surface of the lower supporting member 552 (see FIG. 11), and the supporting pin 552*p* is inserted through the round hole 14H, and is rotatably supported by the supporting pin 552*p*.

The first moving member 14 is held between the first locking member 711 urged by the coil spring 713 toward the lower supporting member 552 and the lower supporting member 552, and is rotatably supported by the supporting pin 552*p*.

The lever 11 is formed so as to extend across the first lock unit 71 and the second lock unit 72 as illustrated in FIG. 5, and is configured to be movable in the lateral direction (±X direction).

The lever 11 is formed of a metal sheet by presswork or the like. The lever 11 includes a center portion 111 positioned between the first lock unit 71 and the second lock unit 72, a bent portion 112 bent downward from a +X side end portion of the center portion 111, a bent portion 113 bent downward from a −X side end portion of the center portion 111, a flat portion 114 arranged on the lower surface of the lower supporting member 552, and a flat portion 115 arranged on a lower surface of the lower supporting member 562.

The center portion 111 is formed so as to extend along an X-Y plane as illustrated in FIG. 5, and includes a projecting portion 111A projecting forward.

The bent portions 112 and 113 are formed with notches 112A and 113A having a U-shape opening rearward (−Y side).

The flat portion 114 is formed in substantially parallel to the center portion 111 and, as illustrated in FIG. 11, is formed with a notch 114A with which the guide pin 142 of the first moving member 14 engages in the ±X direction, and a guide hole 114B which allows insertion of the projection 5523 of the lower supporting member 552 and guides the movement of the lever 11 in the lateral direction.

The flat portion 115 is formed substantially in parallel to the center portion 111, and includes the notch 114A formed in the flat portion 114, a notch similar to the guide hole 114B, and a guide hole, although the detailed illustration is omitted.

The lever auxiliary member 12 is formed of a synthetic resin and, as illustrated in FIG. 5, is fixed to an upper surface of the projecting portion 111A of the lever 11.

The lever auxiliary member 12 is formed with a lever operating unit 121 which projects upward from a center of an upper surface thereof and accepts the operation by the user. The lever operating unit 121 is provided with a knob 121A projecting further upward at a center portion thereof.

The lever operating unit 121 is arranged so as to be exposed from the exterior housing 2 and positioned between the dial 61 and the dial 161 as illustrated in FIG. 2.

The shaft 13 is inserted through an insertion hole 561H provided in the upper supporting member 561 and the notches 112A and 113A (see FIG. 5) of the lever 11, and guides the movement of the lever 11 in the lateral direction.

The lever mechanism 10 is configured in such a manner that the user hooks his or her finger on the knob 121A and presses in the lateral direction, so that the lever 11 is guided by the shaft 13 and moved in the pressed direction.

Action of Lock Mechanism

Here, an action of the lock mechanism 7 will be described.

The lock mechanism 7 is configured in such a manner that when the lever operating unit 121 is operated, the lever 11 is moved to cause the first locking member 711 and the second locking member 721 to move via the first moving member 14 and the second moving member 15, whereby the locking member is switched between the locked state in which the lower gears 62b and 162b are locked and the unlocked state in which the locked state is released to allow the lower gears 62b and 162b be rotatable.

By the movement of the lever 11, the first moving member 14 and the second moving member 15 move in the same manner, and the first locking member 711 and the second locking member 721 move in the same manner. Therefore, the movements of the first moving member 14 and the first locking member 711 are focused for description of the movement in detail.

The lock mechanism 7 of the embodiment is set to be unlocked state when the lever operating unit 121 is positioned on the −X side of the opening portion 211 as illustrated in FIG. 2.

Specifically, when the lever operating unit 121 is positioned on the −X side of the opening portion 211, the lever 11 is brought into a state of being positioned on the most −X side within the movable range.

Figure 12:
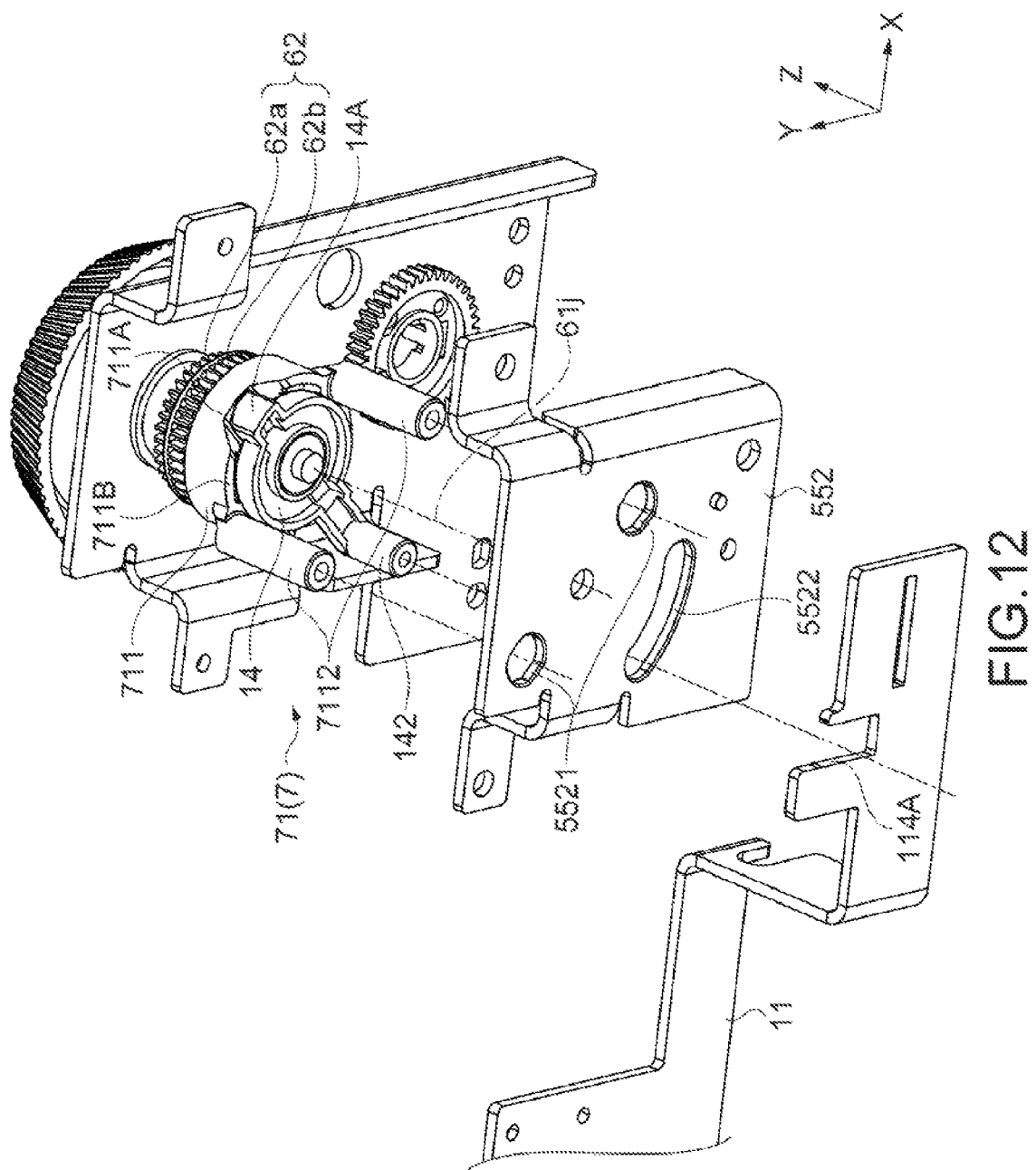
FIG. 12 is an exploded perspective view illustrating a state of a first moving member and a first locking member in an unlocked state of the embodiment.
Figure 13:
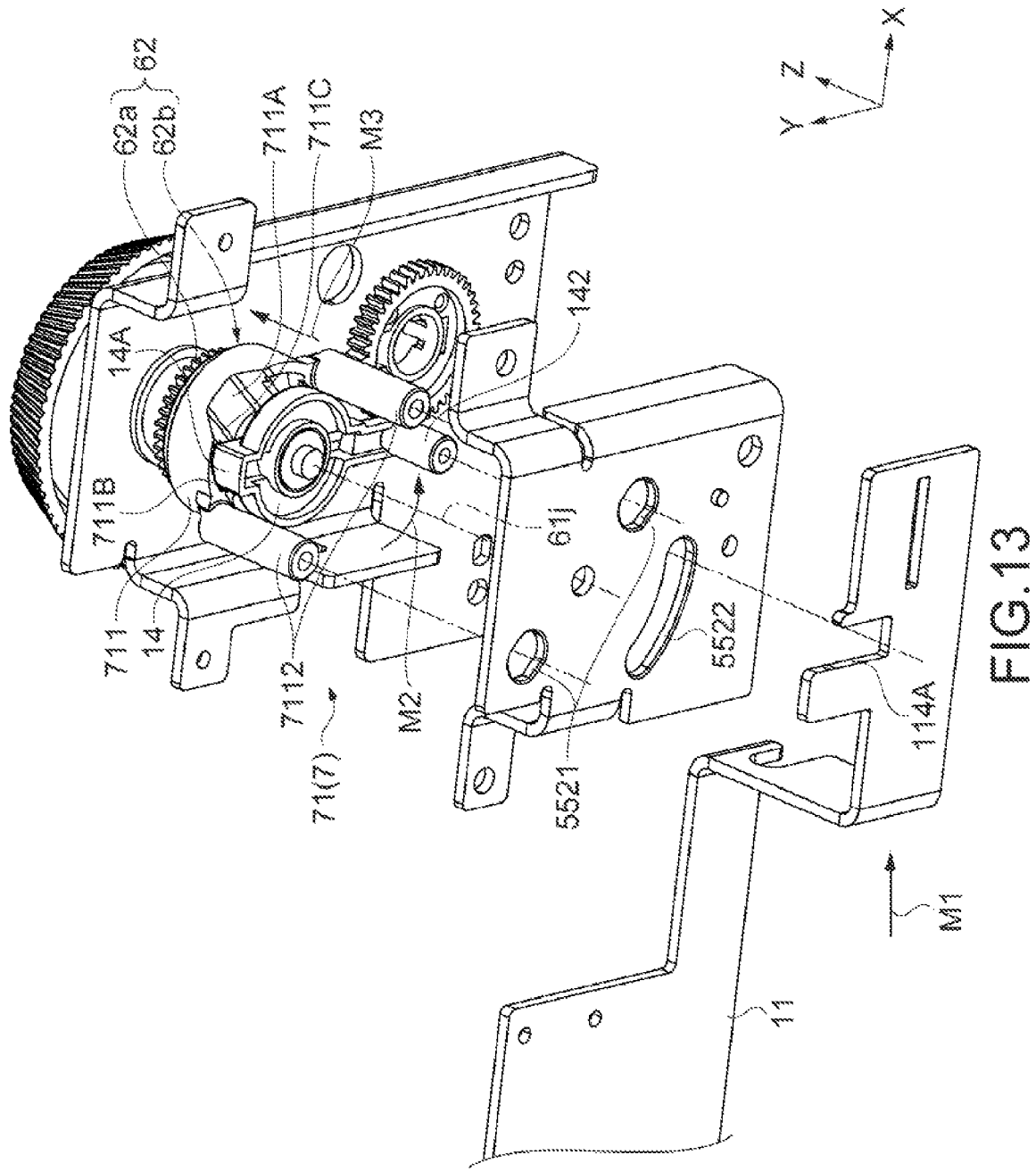
FIG. 13 is an exploded perspective view illustrating the state of the first moving member and the first locking member in a locked state of the embodiment.

FIG. 12 is an exploded perspective view illustrating a state of the first moving member 14 and the first locking member 711 in the unlocked state. FIG. 13 is an exploded perspective view illustrating the state of a first moving member 14 and the first locking member 711 in the locked state.

When the lever 11 is positioned on the most −X side, as illustrated in FIG. 12, the first moving member 14 is brought into a state in which the guide pin 142 engaged with the notch 114A of the lever 11 is positioned on the left side of the guide hole 5522 in view illustrated in FIG. 12. In this state, the first locking member 711 urged toward the lower supporting member 552 is brought into a state in which the depression 711A comes into abutment with the pressing portions 14A of the first moving member 14 and the tooth portion 711G (see FIG. 9) moves away from the lower gear 62b of the drive gear 62.

In the second lock unit 72, when the lever 11 is positioned on the most −X side, the second locking member 721 is brought into a state of coming apart from the lower gear 162b of the drive gear 162 as illustrated in FIG. 4. In other words, the lock mechanism 7 is brought into an unlocked state in which the first locking member 711 and the second locking member 721 do not engage the lower gears 62b and 162b respectively when the lever operating unit 121 is positioned on the −X side of the opening portion 211, so that a state in which the projection lens 36 can be moved by the rotating operation of the dials 61 and 161 is achieved.

In contrast, when the lever operating unit 121 is moved in the +X direction from the unlocked state, the lever 11 moves in the +X direction (the direction indicated by an arrow M1 in FIG. 13). Since the guide pin 142 engages the notch 114A, the first moving member 14 is towed by the lever 11, and rotates counterclockwise (the direction indicated by an arrow M2 in FIG. 13) in the view illustrated in FIG. 13 about the center axis of rotation 61j. Since the first locking member 711 is restricted from rotating by the pair of projecting portions 7112 inserted respectively through the insertion holes 5521, the position of abutment of the pressing portions 14A with respect to the first locking member 711 is changed in sequence from the depression 711A, the oblique surface 711C, and the projections 711B in association with the rotation of the first moving member 14. Consequently, the first locking member 711 is pressed by the pressing portions 14A and moves upward (the direction indicated by an arrow M3 in FIG. 13).

When the lever 11 is brought into a state of being positioned on the most +X side in the movable range, as illustrated in FIG. 13, the first moving member 14 is brought into a state in which the guide pin 142 is positioned on the right side of the guide hole 5522 in the view illustrated in FIG. 13, and the pressing portions 14A come into abutment with the projections 711B.

Then, the first locking member 711 covers the outer peripheral portion of the lower gear 62b, and the tooth portion 711G (see FIG. 9) engages the lower gear 62b to be in the locked state.

Although the detailed illustration is omitted, in the second lock unit 72 as well, when the lever 11 is positioned on the most +X side, the second locking member 721 is brought into a state in which the tooth portion engages the lower gear 162b. In other words, the lock mechanism 7 is brought into the locked state in which the lower gears 62b and 162b are locked when the lever operating unit 121 is positioned on the +X side of the opening portion 211. Since the lower gears 62b and 162b are respectively configured in such a manner that the drive forces from the dials 61 and 161 are transmitted thereto, a state in which the rotating operation of the dials 61 and 161 cannot be performed, that is, in which the position of the projection lens 36 is fixed is achieved when locked.

When the lever operating unit 121 moves in the −X side of the opening portion 211 from the locked state, the first moving member 14 and the second moving member 15 rotate in a direction opposite to the direction when reaching from the unlocked state to the locked state by being towed by the lever 11. The first locking member 711 and the second locking member 721 move away from the lower gears 62*b* and 162*b* respectively and brought into the unlocked state.

In this manner, the lock mechanism 7 is configured in such a manner that when the lever operating unit 121 is operated, the first locking member 711 and the second locking member 721 are moved by rotating the first moving member 14 and the second moving member 15 via the lever 11 whereby the state is switched between a state in which the projection lens 36 is movable in two directions and a state in which the projection lens 36 is immobile.

As described thus far, according to the embodiment, the following effects are achieved.

(1) Since the lens shift mechanism 5 is provided with the lock mechanism 7 configured as described above, the projection lens 36 may be fixed at a desired position by moving the projection lens 36 in the unlocked state by operating the dials 61 and 161 and bringing the state in which the rotating operation of the dials 61 and 161 cannot be performed in the locked state. Therefore, prevention of moving the projection lens 36 by touching the dials 61 and 161 by mistake and removal of a feeling of anxiety that the projection lens 36 might move due to vibrations or the like from the user are enabled.

Since the lock mechanism 7 is configured to switch between the locked state and the unlocked state by the movement of the first locking member 711 and the second locking member 721 along the respective center axes of rotation 61*j* and 161*j* of the members locked thereby (the drive gears 62 and 162), the lock mechanism 7 achieving simplification of the structure and space saving in the direction orthogonal to the center axes of rotation 61*j* and 161*j* (the peripheries of the drive gears and 162) is enabled. Since the structure becomes specifically complex in the lens shift mechanism 5 which allows the movement of the projection lens 36 in the two directions (vertical direction and lateral direction), the remarkable effect is expected. Therefore, increase in size and complexity of manufacture are suppressed, whereby the projector 1 provided with the lens shift mechanism 5 which is capable of moving the projection lens 36 and fixing the projection lens 36 at a desired position may be provided.

(2) The first locking member 711 and the second locking member 721 are configured to be capable of locking the drive gears 62 and 162 rotating about the respective center axes of rotation 61*j* and 161*j* of the dials 61 and 161. Accordingly, in comparison with the configuration in which gears other than the drive gears 62 and 162 are locked, an influence of backrush may be reduced, so that reduction of rattling of the dials 61 and 161 in the locked state and reliable fixation of the projection lens 36 at the desired position are enabled.

(3) The first locking member 711 and the second locking member 721 are urged by the coil springs 713 and 723 in the direction of the center axes of rotation 61*j* and 161*j*, respectively. Accordingly, the first locking member 711 and the second locking member 721 may be positioned at stable positions without an influence of posture of installation of the projector 1 (for example, the stationary installation or hanging installation). Therefore, the projector 1 which achieves the fixation of the projection lens 36 at the desired position without the influence of the posture of installation may be provided.

(4) An operating force which moves the lever 11 is transmitted to the first moving member 14 and the second moving member 15 as a rotational torque and hence moves the first locking member 711 and the second locking member 721. Accordingly, in comparison with a configuration in which the operation force which moves the lever 11 is transmitted linearly to the first locking member 711 and the second locking member 721, smooth movement of the first locking member 711 and the second locking member 721 and setting the amount of movement of the lever to be small are enabled. Therefore, the lock mechanism 7 achieving improvement of an operability and space saving is achieved.

(5) Since the first locking member 711 and the second locking member 721 are formed so as to cover the lower gears 62*b* and 162*b* and lock the same in a well balanced manner in the locked state, the drive gears 62 and 162 are suppressed from being exerted with a force of inclination. Therefore, even when an excessive rotating force is exerted on the dials 61 and 161 in the locked state, breakage of the lens shift mechanism 5 may be suppressed.

(6) Since the lock mechanism 7 is configured to achieve space saving in the direction orthogonal to the center axes of rotation 61*j* and 161*j*, the lock mechanism 7 may be mounted on the projector 1 even when the dials 61 and 161 are arranged at an edge portion of the exterior housing 2. The dial 61 is arranged so that the rib 611 is exposed on the upper side of the exterior housing 2 and part of the side surface 612 is exposed on the front side of the exterior housing 2. Accordingly, since the user is capable of selecting either the upper surface operation or the side surface operation which is convenient for the user corresponding to the installation posture of the projector 1 (for example, the stationary installation, the hanging installation, and the like), whereby improvement of operability when moving the projection lens 36 is enabled. Since the dials 61 and 161 are exposed as described above, the projection lens 36 may be moved by an operation from the side facing a surface of projection of the exterior housing 2 or from the upper side in the stationary installation.

(7) The lever operating unit 121 is arranged between the dial 61 and the dial 161 exposed on the upper side of the exterior housing 2. Accordingly, the user may recognize the position to be operated for moving the projection lens 36 and the position to be operated for fixing the projection lens 36 easily. In addition, the dials 61 and 161 and the lever operating unit 121 may be arranged in an orderly manner, so that design properties of the projector 1 are improved.

(8) Since the lock mechanism 7 is configured to switch the two locking members (the first locking member 711 and the second locking member 721) between the unlocked state and the locked state by the movement of the single lever 11, the state of allowing the movement of the projection lens 36 and the state of fixing the projection lens 36 may be switched easily in the two directions (the vertical direction and the lateral direction).

(9) The lens shift mechanism 5 includes the switching mechanisms 60 and 160 which are capable of switching between the transmitting state and the non-transmitting state. Accordingly, in the movable ranges of the first movable portion 51 and the second movable portion, the drive forces from the dials 61 and 161 may be transmitted reliably to the first movable portion 51 and the second movable portion, and the drive forces in the direction corresponding to the restricted directions of the first movable portion 51 and the second movable portion transmitted from the dials 61 and 161 at the limit of the movable ranges of the first movable portion 51 and the second movable portion may be prevented from being transmitted to the first movable portion 51 and the second movable portion. Therefore, even though the drive force is transmitted to the dials 61 and 161 in the direction corresponding to the restricted direction in a state in which the first movable portion 51 and the second movable portion are moved to the limit of the movable range, the drive force thereof is not transmitted to the first movable portion 51 and the second movable portion, and hence breakage of the first movable portion 51, the second movable portion, members restricting the movement of the first movable portion 51 and the second movable portion, and members constituting the first gear train mechanism 53 and the second gear train mechanism 54 may be prevented.

(10) Since the switching mechanisms 60 and 160 each have a configuration of engaging the first tooth portion 602G provided on the second gear 602 and the second tooth portion 603G provided on the switching member 603, transmission of the drive forces between the both members may be ensured in comparison with the configuration in which a frictional force generated by a slip mechanism is utilized, so that the setting of the members which constitute the switching mechanisms 60 and 160 is facilitated.

Also, transmission of the drive forces from the dials 61 and 161 to the first movable portion 51 and the second movable portion is ensured within the movable ranges of the first movable portion 51 and the second movable portion even when the urging force of the coil spring 604 is smaller than the configuration utilizing the slip mechanism.

Therefore, the lens shift mechanism 5 provided with the switching mechanisms 60 and 160 which achieve reduction in size and weight and are easy to manufacture is achieved. Therefore, the projector 1 having the lens shift mechanism 5 described above may be provided while suppressing increase in size and weight and simplifying the manufacture.

(11) When the dials 61 and 161 are rotated in the direction corresponding to the restricted direction when the first movable portion 51 and the second movable portion reach the limits of the movable ranges, since the switching member 603 rotates while the second tooth portion 603G climbs over the first tooth portion 602G in sequence, an action sound is generated, and hence the user is capable of recognizing the fact that the projection lens 36 reaches the limit of the movable range easily.

Also, the user operating the dials 61 and 161 may have a tactile feedback of click response when the second tooth portion 603G climbs over the first tooth portion 602G, so that the user is capable of recognizing the fact that the first movable portion 51 and the second movable portion reach the limits of the movable ranges easily.

(12) The switching mechanisms 60 and 160 each have a configuration including the first gears 601 and 1601 and the second gears 602 and 1602, improvement of flexibility in setting of the reduction gear ratio or the torque with respect to the drive gears 62 and 162 and the transmitting units 8 and 9 is achieved in comparison with the slip mechanism provided with one gear.

(13) Since the first gears 601 and 1601 are each provided with the storage 6013 for storing the coil spring 604, the switching mechanisms 60 and 160 may be configured with a simple structure while suppressing increase in number of components.

Since the first gears 601 and 1601 are arranged so that the projecting portion 6012 is positioned on a side opposite to the dials 61 and 161, storage of the projecting portion 6012 in the exterior housing 2 by exposing the dials 61 and 161 from the exterior housing 2 is easily achieved. Therefore, the projector 1 in which operability of the lens shift mechanism 5 is improved, and the switching mechanisms 60 and 160 are efficiently stored in the exterior housing 2 and design properties are improved may be provided.

(14) Since the surfaces of the first tooth portion 602G and the second tooth portion 603G engaging each other are each formed of a flat surface, so that the first tooth portion 602G and the second tooth portion 603G are in surface contact with each other and hence the frictional force is increased in comparison with the configuration in which the engaging surfaces are formed by curved surfaces. Accordingly, a reliable transmitting state is ensured even when the amount of engagement between the first tooth portion 602G and the second tooth portion 603G is set to a small amount, or even when the urging force of the coil spring 604 is set to a small value, so that further reduction in size and weight of the switching mechanisms 60 and 160 is achieved.

(15) Since the first tooth portion 602G and the second tooth portion 603G are each formed into a trapezoidal shape in cross section so as to engage with each other in the center axis of rotation 60J direction and in the direction of rotation, smooth switching between the transmitting state and the non-transmitting state between the switching mechanisms 60 and 160 is enabled.

Modification

The embodiment described above may be changed as follows.

In the embodiment described above, the drive gears 62 and 162 are configured to be locked in the locked state. However, a configuration in which the gears other than the drive gears 62 and 162 are locked is also applicable.

In the embodiment described above, the first locking member 711 and the second locking member 721 are formed so as to cover the lower gears 62b and 162b in the locked state. However, a configuration in which the lower gears 62b and 162b are exposed may be employed as long as the lower gears 62b and 162b are locked.

In the embodiment described above, the coil springs 713 and 723 are used as urging portions configured to urge the first locking member 711 and the second locking member 721. However, leaf springs or the like may be used as the urging portions instead of the coil springs.

A configuration in which the flat portions 114 and 115 of the lever 11 are provided with pressing portions each having an inclined surface inclining in the vertical direction instead of the first moving member 14 and the second moving member 15 of the embodiment described above, the first locking member and the second locking member are formed with pressure receiving portions each having an inclined surface corresponding to the inclined surface on the lower surface side thereof, whereby the first locking member and the second locking member are moved by the pressing portions pressing the pressure receiving portions by the movement of the lever 11 is also applicable.

The first operating unit and the second operating unit of the embodiment described above are each configured to generate the drive force by being rotated. However, a configuration in which the drive force is generated by the sliding movement of the first operating unit and the second operating unit is also applicable. A configuration in which the drive force is transmitted to the drive gear by using a rack or the like so as to configure the drive gear to be lockable is also applicable.

In the embodiment described above, the lever 11 is configured to be moved by the lever operating unit 121 being moved in the lateral direction. However, a configuration in which the lever 11 is moved in the lateral direction by the rotation of the lever operating unit is also applicable.

In the embodiment described above, the coil springs 713 and 723 are configured to urge the first moving member 14 and the second moving member 15 toward the lower supporting members 552 and 562 in the direction of the center axes of rotation 61j and 161j. However, a configuration in which the first moving member 14 and the second moving member 15 are urged toward the upper supporting members 551 and 561 in the direction of the center axes of rotation 61j and 161j is also applicable.

In the embodiment described above, the first gears 601 and 1601 are configured to engage the drive gears 62 and 162 and the second gears 602 and 1602 are configured to engage the transmitting units 8 and 9. However, a configuration in which the first gears 601 and 1601 engage the transmitting units 8 and 9 and the second gears 602 and 1602 engage the drive gears 62 and 162 is also applicable.

The switching mechanisms 60 and 160 may be employed in a lens shift mechanism in which a drive force is generated by an electric system having a motor or the like.

In the embodiment described above, the coil spring 604 is used as the urging portion configured to urge the switching member 603. However, a leaf spring or the like may be used as the urging member instead of the coil spring.

Although the projector 1 in the embodiment described above employs the transmissive liquid crystal light valve 43 as the light modulating device, a reflective liquid crystal light valve may also be employed. The light modulating device may be those employing devices using a micromirror array.

The light source 311 is not limited to a discharge-type lamp and may be configured with a solid light source such as lamps of other systems, light-emitting diodes, or lasers.

What is claimed is:

1. A projector comprising:
    a projection lens configured to project light; and
    a lens shift mechanism configured to move the projection lens, wherein
    the lens shift mechanism includes:
        a movable portion configured to support the projection lens and movable in a plane orthogonal to an optical axis of the projection lens,
        an operating unit configured to generate a drive force causing the movable portion to be moved by a manual operation,
        a rotating portion configured to be rotated by the drive force generated by the operating unit transmitted thereto, and
        a lock mechanism capable of switching between a locked state in which the rotating portion is locked and an unlocked state in which the rotating portion is rotatable, and
    the lock mechanism includes:
        a locking member moving along a center axis of rotation of the rotating portion to lock the rotating portion; and
        a lever mechanism configured to move the locking member to switch between the locked state and the unlocked state.

2. The projector according to claim 1, wherein
    the operating unit is a dial configured to generate the drive force by being rotated, and
    the rotating portion is a gear configured to rotate together with the operating unit about the center axis of rotation of the operating unit.

3. The projector according to claim 1, wherein the lock mechanism includes an urging portion configured to urge the locking member in the direction of the center axis of rotation of the rotating portion.

4. The projector according to claim 1, wherein the lever mechanism includes:
    a moving member configured to move the locking member along the center axis of rotation of the rotating portion by the rotation thereof, and
    a lever configured to rotate the moving member by the movement thereof.

5. The projector according to claim 1, further comprising:
    an exterior housing which constitutes an outer jacket of the projector,
    wherein the operating unit is the dial configured to generate the drive force by being rotated, and
    the operating unit is exposed from the exterior housing at one of end portions thereof in the direction of the center axis of rotation and at least part of an outer peripheral portion thereof apart from the center axis of rotation thereof.

6. The projector according to claim 5, wherein at least part of the outer peripheral portion of the operating unit is exposed from the exterior housing to the side where the projection lens projects light and the one of the end portions of the operating unit is exposed to the upper side of the exterior housing in a stationary installation in which the projector is stationary installed.

7. The projector according to claim 5, wherein
    the movable portion is configured to be movable in a first direction and a second direction orthogonal to each other in the plane,
    the operating unit has a first operating unit and a second operating unit,
    the first operating unit configured to generate the drive force causing the movable portion to be moved in the first direction,
    the second operating unit configured to generate the drive force causing the movable portion to be moved in the second direction,
    the lever mechanism includes a lever operating unit which accepts an operation for switching between the locked state and the unlocked state, and
    the lever operating unit is arranged between the one of the end portions of each of the first operating unit and the second operating unit.

* * * * *